United States Patent
Huo et al.

(10) Patent No.: US 12,047,557 B2
(45) Date of Patent: Jul. 23, 2024

(54) COLOUR COMPONENT PREDICTION METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Yanzhuo Ma, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 226 days.

(21) Appl. No.: 17/557,546

(22) Filed: Dec. 21, 2021

(65) Prior Publication Data

US 2022/0116591 A1   Apr. 14, 2022

Related U.S. Application Data

(63) Continuation of application No. PCT/CN2020/090644, filed on May 15, 2020.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/186* (2014.11)

(58) Field of Classification Search
CPC .. H04N 19/105; H04N 19/132; H04N 19/159; H04N 19/176; H04N 19/186;
(Continued)

(56) References Cited

U.S. PATENT DOCUMENTS

2010/0246688 A1   9/2010   Filippini et al.
2015/0016512 A1*  1/2015   Pu ...................... H04N 19/176
                                              375/240.03
(Continued)

FOREIGN PATENT DOCUMENTS

CN   103260018 A   8/2013
CN   104718759 A   6/2015

OTHER PUBLICATIONS

"Multi-model Based Cross-component Linear Model Chroma Intra-prediction for Video Coding", Kai Zhang, Jianle Chen, Li Zhang, Xiang Li, Marta Karczewicz, Dec. 10-13, 2017 (Year: 2017).*
(Continued)

*Primary Examiner* — Jared Walker
(74) *Attorney, Agent, or Firm* — PERKINS COIE LLP

(57) ABSTRACT

Disclosed are a colour component prediction method, encoder, decoder, and storage medium. When CCLM is used for a current block to determine its intra prediction value, the encoder determines multiple groups of corresponding CCLM parameters using multiple groups of reference samples of current block, determines a target CCLM parameter from multiple groups of CCLM parameters; sets a CCLM index value indicating to use the target CCLM parameter and signals same in bitstream; and determines intra prediction value of current block according to the target CCLM parameter. The decoder parses bitstream to determine a prediction mode parameter of current block, parses bitstream to determine a CCLM index value of current block when prediction mode parameter indicates intra prediction value of current block is determined using CCLM; determines target CCLM parameter according to the CCLM index value, and determines intra prediction value of current block according to the target CCLM parameter.

20 Claims, 11 Drawing Sheets

Related U.S. Application Data

(60) Provisional application No. 62/872,694, filed on Jul. 10, 2019.

(51) Int. Cl.
*H04N 19/159* (2014.01)
*H04N 19/176* (2014.01)
*H04N 19/186* (2014.01)

(58) Field of Classification Search
CPC ...... H04N 19/11; H04N 19/593; H04N 19/70; H04N 19/184
See application file for complete search history.

(56) References Cited

U.S. PATENT DOCUMENTS

| | | | |
|---|---|---|---|
| 2016/0024186 A1 | 1/2016 | Wang | |
| 2016/0219283 A1* | 7/2016 | Chen | H04N 19/105 |
| 2019/0289306 A1* | 9/2019 | Zhao | H04N 19/33 |
| 2019/0342546 A1* | 11/2019 | Lin | H04N 19/593 |
| 2020/0195930 A1* | 6/2020 | Choi | H04N 19/176 |
| 2020/0296380 A1* | 9/2020 | Aono | H04N 19/593 |

OTHER PUBLICATIONS

International Search Report dated Aug. 19, 2020 in Application No. PCT/CN2020/090644, 4 Pages.
ITU-T H.265 Telecommunication Standardization Sector of ITU Dated Apr. 2013, Series H: Audiovisual and Multimedia Systems, Infrastructure of audiovisual services, 317 pages.
ITU-T H.265 Telecommunication Standardization Sector of ITU Dated Oct. 2014, Series H: Audiovisual and Multimedia Systems, Infrastructure of audiovisual services, 540 pages.
TU-T H.265 Telecommunication Standardization Sector of ITU Dated Apr. 2015, Series H: Audiovisual and Multimedia Systems, Infrastructure of audiovisual services, 634 pages.
U-T H.265 Telecommunication Standardization Sector of ITU Dated Dec. 2016, Series H: Audiovisual and Multimedia Systems, Infrastructure of audiovisual services, 664 pages.
U-T H.265 Telecommunication Standardization Sector of ITU Dated Feb. 2018, Series H: Audiovisual and Multimedia Systems, Infrastructure of audiovisual services, 692 pages.
U-T H.265 Telecommunication Standardization Sector of ITU Dated Jun. 2019, Series H: Audiovisual and Multimedia Systems, Infrastructure of audiovisual services, 696 pages.
U-T H.265 Telecommunication Standardization Sector of ITU Dated Nov. 2019, Series H: Audiovisual and Multimedia Systems, Infrastructure of audiovisual services, 712 pages.
U-T H.265 Telecommunication Standardization Sector of ITU Dated Aug. 2021, Series H: Audiovisual and Multimedia Systems, Infrastructure of audiovisual services, 716 pages.
U-T H.265 Telecommunication Standardization Sector of ITU Dated Aug. 2020, Series H: Audiovisual and Multimedia Systems, Infrastructure of audiovisual services, 516 pages.
JHU. Hong-Jheng et al, "JVET-N0333 CE3-related: MMLM only cross-component prediction" Joint Video Experts Team (JVET) ofITU-T SG 16 WP 3 and ISO/IEC JTC 1/SC 29/WG 11, 14th Meeting: Geneva, CH, Mar. 19-27, 2019, Mar. 27, 2019 (Mar. 27, 2019), 3 pages.
JHU. Hong-Jheng et al, "JVET-N0333 CE3-related: MMLM only cross-component prediction" Joint Video Experts Team (JVET) ofITU-T SG 16 WP 3 and ISO/IEC JTC 1/SC 29/WG 11, 14th Meeting: Geneva, CH, Mar. 19-27, 2019, Mar. 27, 2019 (Mar. 27, 2019), Power Point presentation, 7 pages.
JHU. Hong-Jheng et al, "JVET-N0333 CE3-related: MMLM only cross-component prediction" Joint Video Experts Team (JVET) ofITU-T SG 16 WP 3 and ISO/IEC JTC 1/SC 29/WG 11, 14th Meeting: Geneva, CH, Mar. 19-27, 2019, Mar. 27, 2019 (Mar. 27, 2019), r1 version, 3 pages.
JHU. Hong-Jheng et al, "JVET-N0333 CE3-related: MMLM only cross-component prediction" Joint Video Experts Team (JVET) ofITU-T SG 16 WP 3 and ISO/IEC JTC 1/SC 29/WG 11, 14th Meeting: Geneva, CH, Mar. 19-27, 2019, Mar. 27, 2019 (Mar 27, 2019), Addendum 8.4.2.8, 9 pages.
JHU. Hong-Jheng et al, "JVET-N0333 CE3-related: MMLM only cross-component prediction" Joint Video Experts Team (JVET) ofITU-T SG 16 WP 3 and ISO/IEC JTC 1/SC 29/WG 11, 14th Meeting: Geneva, CH, Mar. 19-27, 2019, Mar. 27, 2019 (Mar. 27, 2019), Test1 chart, 26 pages.
JHU. Hong-Jheng et al, "JVET-N0333 CE3-related: MMLM only cross-component prediction" Joint Video Experts Team (JVET) ofITU-T SG 16 WP 3 and ISO/IEC JTC 1/SC 29/WG 11, 14th Meeting: Geneva, CH, Mar. 19-27, 2019, Mar. 27, 2019 (Mar. 27, 2019), Test2 chart, 26 pages.
EP Search Report dated Jul. 25, 2022 in Application No. 20837251.6, 12 pages.
India First Office Action dated Jun. 20, 2022 in Application No. 202117058273, 6 pages.
Keating et al., Non-CE3: Alternative LM Chroma Implementation, Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0044, XP30200072A, 5 pages.
Van Der Auwera, BoG report on intra prediction and mode coding (CE3-related), Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0857-v2, XP30202064A, 24 pages.
Huo et al., CE3: Offset-based reference sample reduction for CCLM (Tests 1.2.1 and 1.2.2), Joint Video Experts Team (JVET), of ITU-T SG 16 WP 3 and ISO/IEC JTC 1/SC 29/WG 11, 14th Meeting: Geneva, CH, Mar. 19-27, 2019 Document: JVET-N0131-vl, XP30203368A, 6 pages.
Bross et al., Versatile Video Coding (Draft 5), Joint Video Experts Team (JVET), ofITU-T SG 16 WP 3 and 1S0/IEC JTC 1/SC 29/WG 11, 14th Meeting: Geneva, CH, Mar. 19-27, 2019, Document: JVET-NIO0I-vIO, XP30220731A, 406 pages.
Hearing Notice for Indian Application No. 202117058273 issued Feb. 20, 2024. 3 pages.

\* cited by examiner

COLOUR COMPONENT PREDICTION METHOD, ENCODER, DECODER, AND STORAGE MEDIUM

CROSS-REFERENCE TO RELATED APPLICATIONS

The present application is a continuation application of International PCT Application No. PCT/CN2020/090644, filed on May 15, 2020, which claims the priority of the U.S. Provisional Application No. 62/872,694 filed on Jul. 10, 2019. The above-identified applications are hereby incorporated by reference in their entirety.

TECHNICAL FIELD

Embodiments of the present application relate to the field of picture processing technologies, and more particularly, to a method for predicting a colour component, an encoder, a decoder, and a storage medium.

BACKGROUND

With improvement of people's requirements for video display quality, new video application forms such as high-definition and ultra-high-definition videos have emerged. H.265/High Efficiency Video Coding (HEVC) has become unable to meet requirements of rapid development of video applications. The Joint Video Exploration Team (JVET) puts forward the next generation video coding standard H.266/Versatile Video Coding (VVC), a corresponding test model of which is a VVC Test Model (VTM).

In VVC, a prediction from a luma value to a chroma value or a prediction between chroma values may be achieved through a Cross-component Linear Model Prediction (CCLM) mode. Specifically, a linear regression method may be used for constructing a linear model for adjacent luma parameters and chroma parameters corresponding to a current block, so that a chroma prediction value may be calculated according to the linear model and a reconstructed luma value. In a process of intra prediction using the CCLM mode, a position of an adjacent block of the current block needs to be determined, which will greatly increase complexity of encoding and decoding processing and reduce encoding and decoding efficiency.

SUMMARY

The embodiments of the present application provide a method for predicting a colour component, an encoder, a decoder, and a storage medium, which greatly reduces complexity of encoding and decoding processing and improves encoding and decoding efficiency.

Technical solutions of the embodiments of the present application may be implemented as follows.

In a first aspect, an embodiment of the present application provides a method for predicting a colour component, which is applied to an encoder. The method includes: determining multiple groups of corresponding Cross-component Linear Model Prediction (CCLM) parameters using multiple groups of reference samples of a current block when CCLM is used for the current block to determine an intra prediction value of the current block; wherein the CCLM parameter includes a scale factor and an offset parameter; determining a target CCLM parameter from the multiple groups of CCLM parameters, setting a CCLM index value according to the target CCLM parameter and signalling the CCLM index value in a bitstream, wherein the CCLM index value is used for indicating to use the target CCLM parameter; and determining the intra prediction value of the current block according to the target CCLM parameter.

In a second aspect, an embodiment of the present application provides a method for predicting a colour component, which is applied to a decoder. The method includes: parsing a bitstream and determining a prediction mode parameter of a current block; parsing the bitstream and determining a Cross-component Linear Model Prediction (CCLM) index value of the current block when the prediction mode parameter indicates to determine an intra prediction value of the current block using CCLM; determining a target CCLM parameter of the current block according to the CCLM index value, wherein the target CCLM parameter includes a scale factor and an offset parameter; and determining the intra prediction value of the current block according to the target CCLM parameter.

In a third aspect, an embodiment of the present application provides an encoder, including: a first determining part and a setting part. The first determining part is configured to determine multiple groups of corresponding Cross-component Linear Model Prediction (CCLM) parameters using multiple groups of reference samples of a current block when CCLM is used for the current block to determine an intra prediction value of the current block, wherein the CCLM parameter includes a scale factor and an offset parameter; and determine a target CCLM parameter from the multiple groups of CCLM parameters. The setting part is configured to set a CCLM index value according to the target CCLM parameter and signal the CCLM index value in a bitstream, wherein the CCLM index value is used for indicating to use the target CCLM parameter. The first determining part is further configured to determine the intra prediction value of the current block according to the target CCLM parameter.

In a fourth aspect, an embodiment of the present application provides an encoder, which includes a first processor and a first memory storing instructions executable for the first processor, wherein when the instructions are executed, the first processor implements the above method for predicting a colour component.

In a fifth aspect, an embodiment of the present application provides a decoder, including: a parsing part and a second determining part, wherein the parsing part is configured to parse a bitstream and determine a prediction mode parameter of a current block; and parse the bitstream and determine a Cross-component Linear Model Prediction (CCLM) index value of the current block when the prediction mode parameter indicates to determine an intra prediction value of the current block using CCLM; the second determining part is configured to determine a target CCLM parameter of the current block according to the CCLM index value, wherein the target CCLM parameter includes a scale factor and an offset parameter; and determine the intra prediction value of the current block according to the target CCLM parameter.

In a sixth aspect, an embodiment of the present application provides a decoder, which includes a second processor and a second memory storing instructions executable for the second processor, wherein when the instructions are executed, the second processor implements the above method for predicting a colour component.

In a seventh aspect, an embodiment of the present application provides a computer-readable storage medium, on which a computer program is stored, wherein the computer program, when executed by a first processor and a second processor, implements the above method for predicting a colour component.

The embodiments of the present application provide a method for predicting a colour component, an encoder, a decoder, and a storage medium. When CCLM is used for a current block to determine an intra prediction value of the current block, an encoder determines multiple groups of corresponding CCLM parameters using multiple groups of reference samples of the current block, wherein a CCLM parameter includes a scale factor and an offset parameter. The encoder determines a target CCLM parameter from the multiple groups of CCLM parameters, and sets a CCLM index value according to the target CCLM parameter and signals the CCLM index value in a bitstream, wherein the CCLM index value is used for indicating to use the target CCLM parameter. The encoder determines the intra prediction value of the current block according to the target CCLM parameter. The decoder parses a bitstream and determines a prediction mode parameter of a current block; parses the bitstream and determines a CCLM index value of the current block when the prediction mode parameter indicates to determine an intra prediction value of the current block using CCLM. The decoder determines a target CCLM parameter of the current block according to the CCLM index value, wherein the target CCLM parameter includes a scale factor and an offset parameter; and determines the intra prediction value of the current block according to the target CCLM parameter.

It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined using the target CCLM parameter.

That is to say, according to the method for predicting the colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

DETAILED DESCRIPTION

Figure 1:
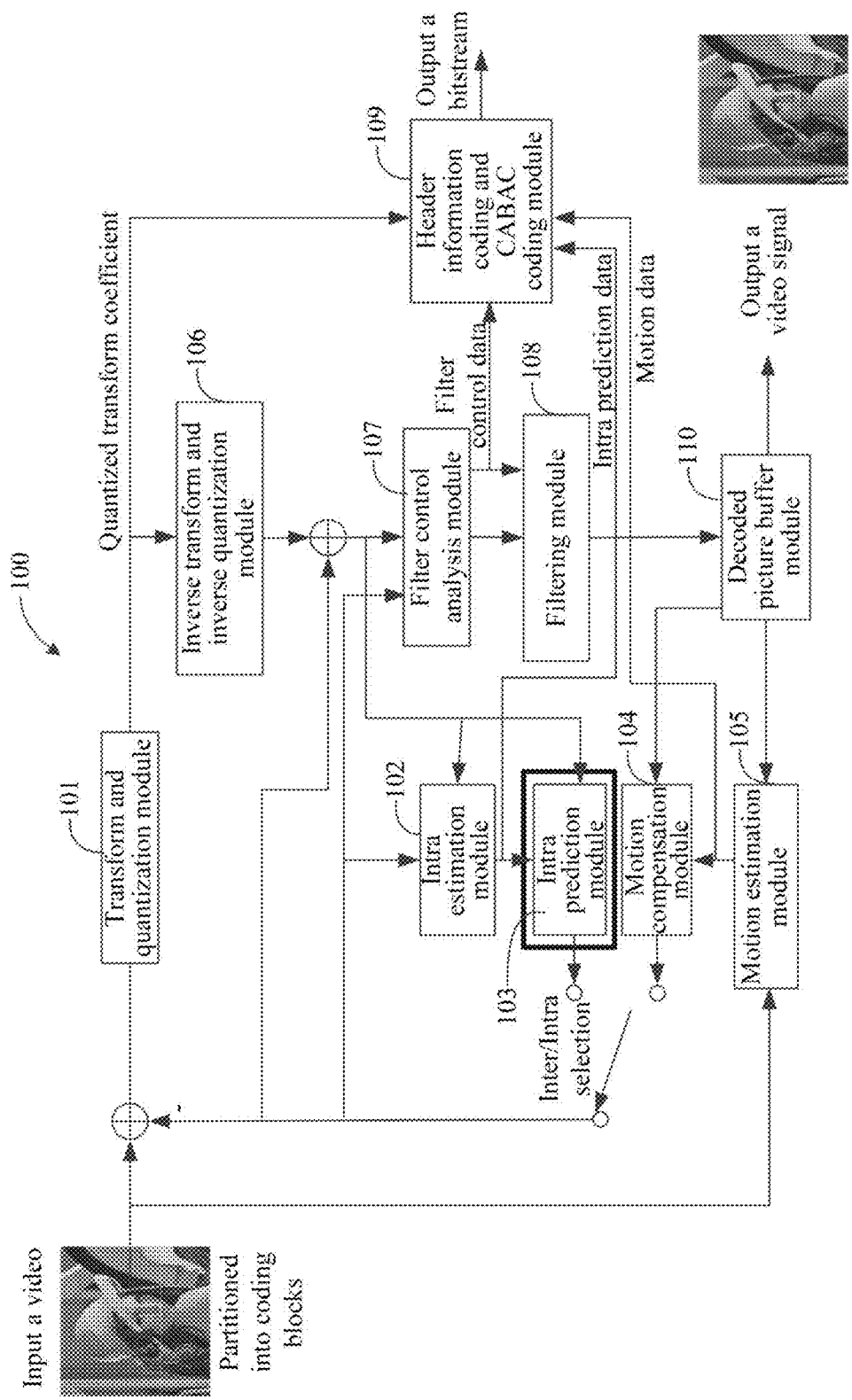
FIG. 1 is a schematic diagram of a structure of a video encoding system.

In order to understand features and technical contents of embodiments of the present application in more detail, implementations of the embodiments of the present application will be described in detail below in combination with the accompanying drawings, which are for reference only and are not intended to limit the embodiments of the present application.

At present, a standardization project named Versatile Video Coding (VVC) initiated by the International Telecommunication Union-Transmission (ITU-T) and the International Organization for Standardization (ISO)/International Electrotechnical Commission (IEC) is aimed at developing a new generation video coding standard, a purpose of which is that when encoding a high-quality video with one or more characteristics of a high resolution, a high frame rate, a high bit depth, a high dynamic range, a wide color gamut, and an omnidirectional view, compared with the latest H.265/HEVC standard, performance of VVC is improved by about 50%. The JVET is in charge of this standardization project. Various intra prediction modes and inter prediction modes have been verified to achieve a high compression efficiency when encoding a high-quality video, so they are adopted in a working draft of VVC.

A CCLM mode is an intra prediction mode, which indicates that prediction of a chroma component of a current block (i.e., a current coding block in an encoder or a current block in a decoder) is obtained using a linear model. In the CCLM mode, a reconstructed chroma component of the current block is used as an input of the linear model, and a parameter of the linear model is calculated using adjacent samples (i.e., reference samples) of the chroma component and luma component of the current block.

In a video picture, a Coding Block (CB) is generally characterized by a first colour component, a second colour component, and a third colour component. The three colour components are respectively a luma component, a blue chroma component, and a red chroma component. Specifically, the luma component is usually represented by a symbol Y, the blue chroma component is usually represented by a symbol Cb or U, and the red chroma component is usually represented by a symbol Cr or V. In this way, the video picture may be expressed in a format of YCbCr or a format of YUV.

In an embodiment of the present application, the first colour component may be a luma component, the second colour component may be a blue chroma component, and the third colour component may be a red chroma component, which is not specifically limited in the embodiments of the present application.

In H.266, in order to further improve coding performance and coding efficiency, Cross-component Prediction (CCP) is extended and improved, and CCLM is proposed. In H.266, CCLM achieves prediction from a first colour component to a second colour component, prediction from the first colour component to a third colour component, and prediction between the second colour component and the third colour component.

Specifically, in an embodiment of the present application, when a CCLM mode is used for prediction from a luma component to a chroma component, in order to reduce redundancy between the luma component and the chroma component and redundancy between different chroma components, the Cross-component Linear Model Prediction (CCLM) mode is used in the next generation video coding standard. For example, according to a formula (1), a prediction value of chroma is constructed using a reconstructed luma value of a same coding block.

$$Pred_C[i, j] = \alpha \cdot Rec_L[i, j] + \beta \quad (1)$$

Where i, j represents a position coordinate of a sampling point in a coding block, i represents a horizontal direction, j represents a vertical direction, $Pred_C[i,j]$ represents a prediction value of a second colour component of a sampling point with a position coordinate of [i, j] in a coding block, $Rec_L[i,j]$ represents a reconstruction value of a first colour component of a sampling point with a position coordinate of [i, j] in a same coding block (after down-sampling), α is a scale factor of a linear model, and β is an offset parameter, which may be derived by minimizing a regression error between an adjacent reference value of the first colour component and an adjacent reference value of the second colour component, as shown in a following formula (2).

$$\begin{cases} \alpha = \dfrac{N \cdot \sum (L(n) C(n)) - \sum L(n) \cdot \sum C(n)}{N \cdot \sum (L(n) \cdot L(n)) - \sum L(n) \cdot \sum L(n)} \\ \beta = \dfrac{\sum C(n) - \alpha \cdot \sum L(n)}{N} \end{cases} \quad (2)$$

Where L (n) represents the adjacent reference value of the first colour component after down-sampling (e.g. left and upper side), C(n) represents the adjacent reference value of the second colour component (e.g. left and upper side), and N is a quantity of adjacent reference values of the second colour component.

Specifically, in addition to including a method for predicting a chroma component with a luma component, i.e., a method for predicting a second colour component with a first colour component or predicting a third colour component with a first colour component, the CCLM mode also includes prediction between two chroma components, i.e., also includes an approach of prediction between a second colour component and a third colour component. In an embodiment of the present application, a Cr component may be predicted from a Cb component, and the Cb component may also be predicted from the Cr component.

It should be noted that in an embodiment of the present application, prediction between chroma components in CCLM, that is, prediction between a second colour component and a third colour component, may be applied to a residual domain. Taking prediction of a Cr component as an example, a Cb residual may be used for predicting a Cr residual. A final prediction value of the Cr component is obtained by adding a weighted reconstructed Cb residual to a traditional intra prediction value of the Cr component, as shown in a formula (3).

$$Pred_{Cr}^*[i, j] = \gamma \cdot resi'_{Cb}[i, j] + Pred_{Cr}[i, j] \quad (3)$$

Where $pred_{Cr}^*[i, j]$ represents a final prediction value of a Cr component of a sampling point with a position coordinate of [i, j] in the current coding block, $resi_{Cb}'[i, j]$ is a prediction residual of a reconstructed Cb component, and a calculation approach of a scale factor γ is the same as a calculation approach of a parameter of a prediction model from a luma component to a chroma component in CCLM, but an only difference is that a regression cost related to a default γ value in an error function is added. Therefore, an obtained scale factor γ may be biased towards a default value of −0.5. Specifically, the scale factor γ may be calculated through a formula (4).

$$\gamma = \frac{N \cdot \sum (Cb(n) \cdot Cr(n)) - \sum Cb(n) \cdot \sum Cr(n) + \lambda \cdot (-05)}{N \cdot \sum (Cb(n) \cdot Cb(n)) - \sum Cb(n) \cdot \sum Cb(n) + \lambda} \quad (4)$$

Where Cb(n) represents an adjacent reference Cb value of the current coding block, Cr(n) represents an adjacent reference Cr value of the current coding block, and λ may be an empirical value, for example, λ=Σ(Cb (n)·Cb (n))>>9.

For existing H.266/VVC, in a process of intra prediction using a CCLM mode, a position of an adjacent block of a current block needs to be determined, which will greatly increase complexity of encoding and decoding processing and reduce encoding and decoding efficiency.

To overcome the above defects, in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use the target CCLM parameter is signalled in a bitstream by the encoder and transmitted to a decoding side. Therefore, a decoder may obtain the CCLM index value after parsing the bitstream, and determine the target CCLM parameter indicated by the CCLM index value, so that the target CCLM parameter may be used for determining the intra prediction value of the current block. That is to say, according to a method for predicting a colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

Figure 2:
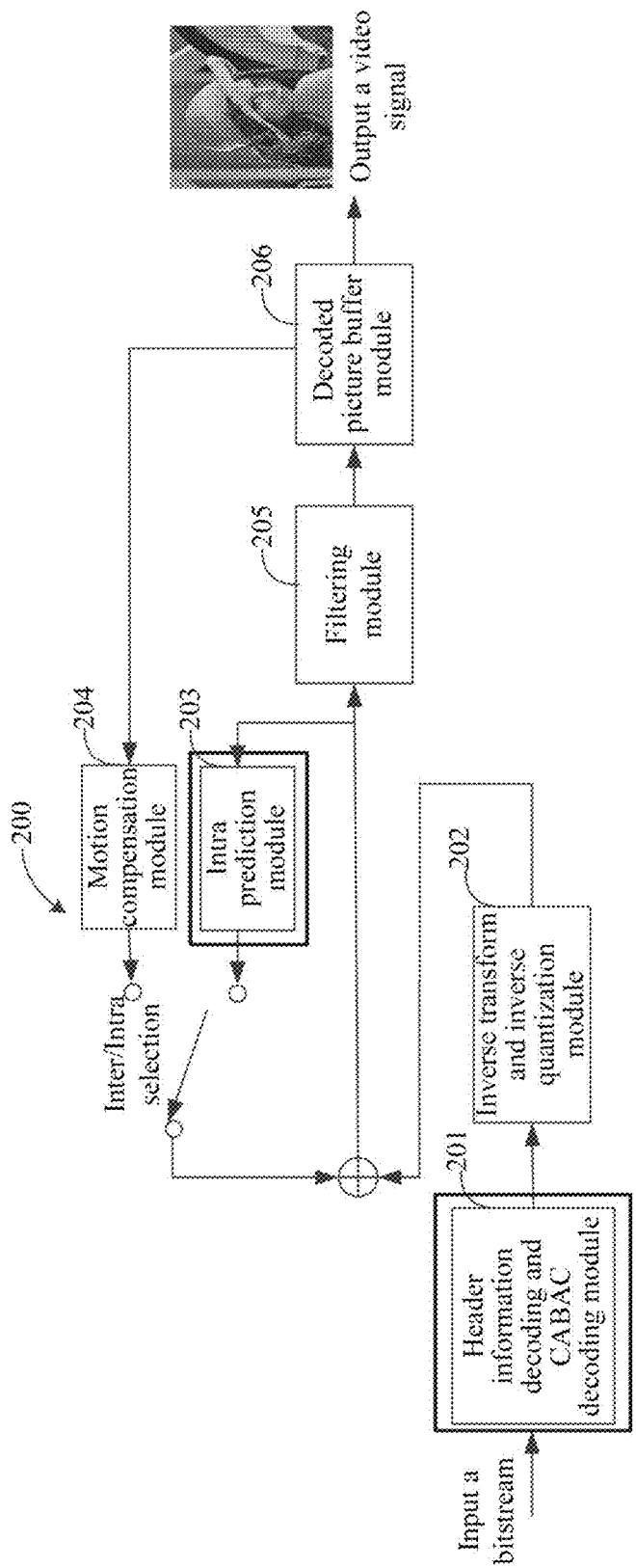
FIG. 2 is a schematic diagram of a structure of a video decoding system.

FIG. 1 is a schematic diagram of a structure of a video encoding system. As shown in FIG. 1, the video encoding system 100 includes a transform and quantization module 101, an intra estimation module 102, an intra prediction module 103, a motion compensation module 104, a motion estimation module 105, an inverse transform and inverse quantization module 106, a filter control analysis module 107, a deblocking filtering and Sample Adaptive Offset (SAO) filtering module 108, a header information coding and Context-based Adaptive Binary Arithmetic Coding (CABAC) coding module 109, a decoded picture buffer module 110, and other components. FIG. 2 is a schematic diagram of a structure of a video decoding system. As shown in FIG. 2, the video decoding system 200 includes a header information decoding and CABAC decoding module 201, an inverse transform and inverse quantization module 202, an intra prediction module 203, a motion compensation module 204, a deblocking filtering and SAO filtering module 205, a decoded picture buffer module 206, and other components. After a video picture is processed by parts in the video encoding system 100, such as the transform and quantization module 101, the intra estimation module 102, the intra prediction module 103, the motion compensation module 104, the motion estimation module 105, the deblocking filtering and SAO filtering module 108, and the header information coding and CABAC module 109, a bitstream of the video picture is output. The bitstream is input into the video decoding system 200 and processed by parts in the video decoding system 200, such as the header information decoding and CABAC decoding module 201, the inverse transform and inverse quantization module 202, the intra prediction module 203, and the motion compensation module 204, and is finally restored to an original video picture.

The method for predicting a colour component provided in the present application may affect an intra prediction process in an encoding and decoding process. Exemplarily, the method for predicting a colour component provided in the present application may be applied at a position of the intra prediction module 103 in the structure of the video encoding system shown in FIG. 1, and may also be applied at a position of the intra prediction module 203 in the structure of the video decoding system shown in FIG. 2.

The following will clearly and completely describe the technical solutions in the embodiments of the present application with reference to the drawings in the embodiments of the present application, wherein in the following embodiments, a first colour component may be a luma component Y, a second colour component may be a red chroma component Cr, and a third colour component may be a blue chroma component Cb, which is not specifically limited in the embodiments of the present application.

Figure 3:
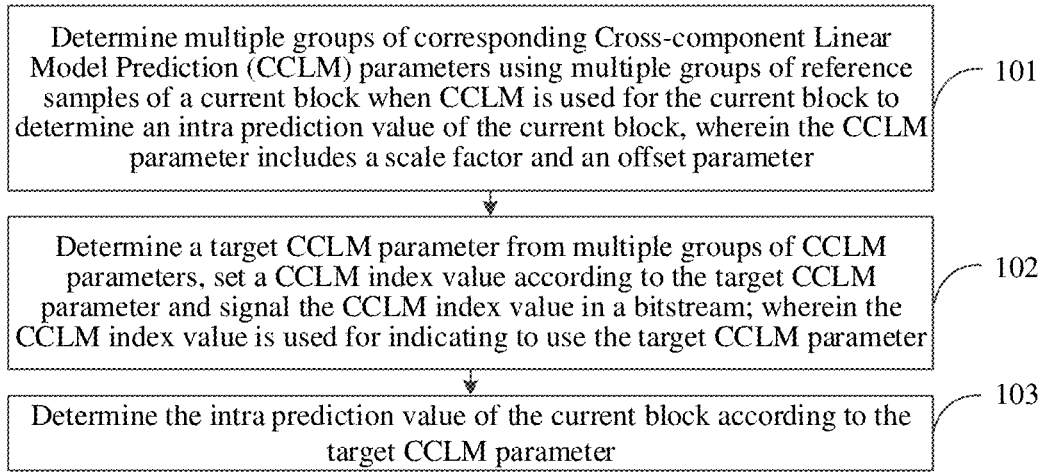
FIG. 3 is a first flowchart of an implementation of a method for predicting a colour component.

An embodiment of the present application provides a method for predicting a colour component, which is applied to an encoder. FIG. 3 is a first flowchart of an implementation of a method for predicting a colour component. As shown in FIG. 3, in the present application, a method for an encoder to predict a colour component may include following acts.

In act 101, multiple groups of corresponding CCLM parameters are determined using multiple groups of reference samples of a current block when CCLM is used for the current block to determine an intra prediction value of the current block, wherein the CCLM parameter includes a scale factor and an offset parameter.

In the embodiment of the present application, if the CCLM is used for the current block to determine the intra prediction value of the current block, an encoder may use multiple groups of reference samples of the current block to determine multiple groups of corresponding CCLM parameters. Specifically, a group of reference samples corresponds to a group of CCLM parameters.

It may be understood that in the embodiment of the present application, each group of CCLM parameters includes a scale factor and an offset parameter determined through a corresponding group of reference samples.

It should be noted that in the embodiment of the present application, a video picture may be divided into multiple picture blocks, wherein the current block is a picture block to be encoded, and may also be called a Coding Block (CB). Specifically, each coding block may include a first colour component, a second colour component, and a third colour component. Accordingly, the current block is a coding block of which a first colour component, a second colour component, or a third colour component is currently to be predicted, in a video picture.

It may be understood that in the embodiment of the present application, assuming that a first colour component is predicted for a current block, and the first colour component is a luma component, that is, a colour component to be predicted is a luma component, then the current block may also be called a luma block. Or, assuming that a second colour component is predicted for a current block, and the second colour component is a chroma component, that is, a colour component to be predicted is a chroma component, then the current block may also be called a chroma block.

It should be noted that, in the embodiment of the present application, multiple groups of reference samples of a current block may include pixel sampling points adjacent to the current block, wherein each group of reference samples in the multiple groups of reference samples may include one or more pixel sampling points adjacent to the current block.

That is to say, in the present application, after determining that CCLM is used for a current block to determine an intra prediction value of the current block, an encoder may determine CCLM parameters using pixel sampling points adjacent to the current block, that is, an encoder may determine multiple groups of corresponding CCLM parameters using multiple groups of reference samples of the current block.

Further, in the embodiment of the present application, when the encoder uses the multiple groups of reference samples of the current block to determine the groups of corresponding CCLM parameters, it may use a group of reference samples in the multiple groups of reference samples to calculate a group of CCLM parameters corresponding to the group of reference samples, and then traverse each group of reference samples in the multiple groups of reference samples, thereby to determine multiple groups of CCLM parameters corresponding to the multiple groups of reference samples.

It may be understood that in an embodiment of the present application, each group of CCLM parameters in multiple groups of CCLM parameters may include a scale factor and an offset parameter. Specifically, the scale factor may be $\alpha$ in the above formula (1), and the offset parameter may be $\beta$ in the above formula (1). That is to say, for a group of reference samples of a current block, an encoder may determine a group of corresponding CCLM parameters including a scale factor $\alpha$ and an offset parameter $\beta$, accordingly, based on multiple groups of reference samples of the current block, multiple groups of CCLM parameters including scale factors $\alpha$ and offset parameters $\beta$ may be finally determined.

Further, in an embodiment of the present application, before using multiple groups of reference samples of a current block to determine multiple groups of corresponding CCLM parameters, an encoder may determine a prediction mode parameter of the current block first.

It should be noted that in the embodiment of the present application, the prediction mode parameter indicates a coding mode of a current block and a parameter related to this mode, that is, a value of the prediction mode parameter may indicate an intra prediction mode used for the current block. Generally, the prediction mode parameter of the current block may be determined through an approach of Rate Distortion Optimization.

Further, in an embodiment of the present application, a coding mode may include two categories: a traditional intra prediction mode and a non-traditional intra prediction mode. Specifically, the traditional intra prediction mode may include a Direct Current (DC) mode, a PLANAR mode, an angular mode, etc. The non-traditional intra prediction mode may include a Matrix-based Intra Prediction (MIP) mode, a CCLM mode, an Intra Block Copy (IBC) mode, a Palette (PLT) mode, etc.

That is, in the embodiment of the present application, an encoder may determine a coding mode of a current block is which specific coding mode included in a traditional intra prediction mode or included in a non-traditional intra prediction mode, through setting of a prediction mode parameter.

In an embodiment of the present application, further, when determining a prediction mode parameter of a current block, an encoder may first determine a colour component to be predicted of the current block; then, based on a parameter of the current block, the colour component to be predicted is predicted and encoded using multiple prediction modes respectively, and a rate distortion cost result corresponding to each prediction mode in the multiple prediction modes is calculated; finally, a minimum rate distortion cost result may be selected from calculated multiple rate distortion cost results, and a prediction mode corresponding to the minimum rate distortion cost result is determined as the prediction mode parameter of the current block.

That is to say, on an encoder side, for a current block, multiple prediction modes may be adopted to encode a colour component to be predicted respectively. Here, multiple prediction modes usually include a traditional intra prediction mode and a non-traditional intra prediction mode.

Further, in an embodiment of the present application, after an encoder encodes a current block using multiple prediction modes, respectively, a rate distortion cost result corresponding to each prediction mode may be obtained. Then a minimum rate distortion cost result is selected from obtained multiple rate distortion cost results, and a prediction mode corresponding to the minimum rate distortion cost result is determined as a prediction mode parameter of the current block. In this way, finally the current block may be encoded using the determined prediction mode, and in this prediction mode, a prediction residual can be small and an encoding efficiency can be improved.

It may be understood that in the embodiment of the present application, after determining the prediction mode parameter of the current block, the encoder may signal the prediction mode parameter in a bitstream, so that a decoder may determine the prediction mode parameter of the current block by parsing the bitstream after the bitstream is transmitted to a decoding side.

In act 102, a target CCLM parameter is determined from multiple groups of CCLM parameters, a CCLM index value is set according to the target CCLM parameter and signalled in a bitstream; wherein the CCLM index value is used for indicating to use the target CCLM parameter.

In the embodiment of the present application, after using multiple groups of reference samples of a current block to determine multiple groups of corresponding CCLM parameters, an encoder may continue to determine a target CCLM parameter from the multiple groups of CCLM parameters, and then may set a CCLM index value according to the target CCLM parameter, and signal the CCLM index value in a bitstream. Specifically, in the present application, the CCLM index value is used for indicating to use the target CCLM parameter for determining an intra prediction value of the current block.

Further, in the present application, after determining a target CCLM parameter from multiple groups of CCLM parameters, an encoder needs to set an index value corresponding to the target CCLM parameter according to the target CCLM parameter, that is, set a CCLM index value, and then the CCLM index value is signalled in a bitstream and transmitted to a decoding side, so that a decoder may determine to use the target CCLM parameter to determine an intra prediction value of a current block according to the CCLM index value obtained by parsing the bitstream.

It should be noted that in the embodiment of the present application, when determining a target CCLM parameter from multiple groups of CCLM parameters, an encoder may select a group of CCLM parameters corresponding to an optimal value of a target cost function from the multiple groups of CCLM parameters using an approach of Rate Distortion Optimization (RDO), and determine the group of CCLM parameters as the target CCLM parameter.

Exemplarily, in the present application, an encoder may use multiple groups of CCLM parameters to predict and encode a colour component to be predicted based on a parameter of a current block, and calculate a rate distortion cost result corresponding to each group of CCLM parameters in the multiple groups of CCLM parameters; finally, a minimum rate distortion cost result may be selected from calculated multiple rate distortion cost results, and a group of CCLM parameters corresponding to the minimum rate distortion cost result may be determined as the target CCLM parameter of the current block.

Further, in an embodiment of the present application, when an encoder sets a CCLM index value according to a target CCLM parameter and signals the CCLM index value in a bitstream, the encoder may first set the CCLM index value as an index number corresponding to the target CCLM parameter in multiple groups of CCLM parameters, and then signal the CCLM index value in the bitstream. That is to say, in the present application, each group of CCLM parameters in multiple groups of CCLM parameters has a corresponding index number, and after an encoder determines the target CCLM parameter used for a current block from the multiple groups of CCLM parameters, the index number corresponding to the target CCLM parameter may be used to set the CCLM index value.

It may be understood that in the embodiment of the present application, an encoder may first determine position information of each group of reference samples in multiple groups of reference samples; and then, according to the position information of each group of reference samples, determine an index number of each group of CCLM parameters.

It should be noted that in the embodiment of the present application, based on size information of a current block, position information corresponding to each group of reference samples may include a starting position and a step length. Specifically, an encoder may use a width W and a height H of a current block to calculate position information of each group of reference samples.

Exemplarily, in an embodiment of the present application, an encoder may respectively calculate to obtain a starting position s and step length Δ according to following formulas.

$$\Delta = L/(N/2) \quad (5)$$

$$s = \Delta/2 \quad (6)$$

Where L is a quantity of reference samples in an upper adjacent position of a current block or a quantity of reference samples in a left adjacent position of a current block; N is a quantity of adjacent samples expected to be used for establishing a subset of reference samples.

Further, in an embodiment of the present application, when an encoder determines an index number of each group of CCLM parameters in multiple groups of CCLM parameters according to position information of each group of reference samples, it may first determine multiple distance parameters between multiple groups of reference samples and a current block according to the position information of each group of reference samples. Then, according to an order of distance parameters from small to large, the encoder sets the index number of each group of CCLM parameters in multiple groups of reference samples sequentially.

That is to say, in the present application, an encoder may first calculate to obtain multiple distance parameters between multiple groups of reference samples and a current block according to position information of each group of reference samples in the multiple groups of reference samples, that is, any one group of reference samples in the multiple groups of reference samples corresponds to one distance parameter. Then, the encoder may sort the multiple distance parameters, for example, sort the multiple distance parameters in an order from small to large to obtain sorted distance parameters, and accordingly, the encoder may set an index number of each group of CCLM parameters in multiple groups of CCLM parameters according to the sorted distance parameters. Specifically, based on a correspondence among multiple groups of reference samples, multiple groups of CCLM parameters, and multiple groups of distance parameters, the encoder may sequentially set an index number of each group of CCLM parameters in the multiple groups of CCLM parameters according to sorted distance parameters.

It may be understood that in the embodiment of the present application, after the encoder sets the CCLM index value according to the target CCLM parameter, the CCLM index value may be signalled in a data unit containing encoded data of a current block in a bitstream by the encoder, so as to facilitate a parsing processing later on a decoder side.

In act 103, the intra prediction value of the current block is determined according to the target CCLM parameter.

In an embodiment of the present application, after determining a target CCLM parameter from multiple groups of CCLM parameters, an encoder may determine an intra prediction value of a current block according to the target CCLM parameter.

It may be understood that in the present application, after determining a target CCLM parameter used for a current block, an encoder may further determine an intra prediction value of the current block using the target CCLM parameter, so that a prediction difference between the current block and the intra prediction value may be calculated.

Exemplarily, in an embodiment of the present application, a target CCLM parameter includes a scale factor and an offset parameter that are used in intra prediction of a current block. Therefore, when determining the intra prediction value of the current block according to the target CCLM parameter, an encoder may calculate to obtain a prediction value $Pred_C[i,j]$ of a second colour component of a sampling point whose position coordinate is 11 in a coding block using a reconstruction value $Rec_L[i, j]$ of a first colour component of a sampling point (after down-sampling) whose position coordinate is [i, j] in the coding block according to the above formula (1).

Exemplarily, in an embodiment of the present application, after determining an intra prediction value of a current block, an encoder may continue to calculate a difference between a real pixel value of the current block and the intra prediction value, and take the calculated difference as a prediction difference, which is convenient for a transform processing on the prediction difference later.

That is to say, in an embodiment of the present application, when an encoder determines an intra prediction value of a current block according to a target CCLM parameter, the encoder may use a linear model to calculate a prediction value of a second colour component of the current block according to the target CCLM parameter and a reconstruction value of a first colour component of the current block.

Specifically, in the present application, the first colour component is a luma component; and the second colour component is a chroma component.

Figure 4:
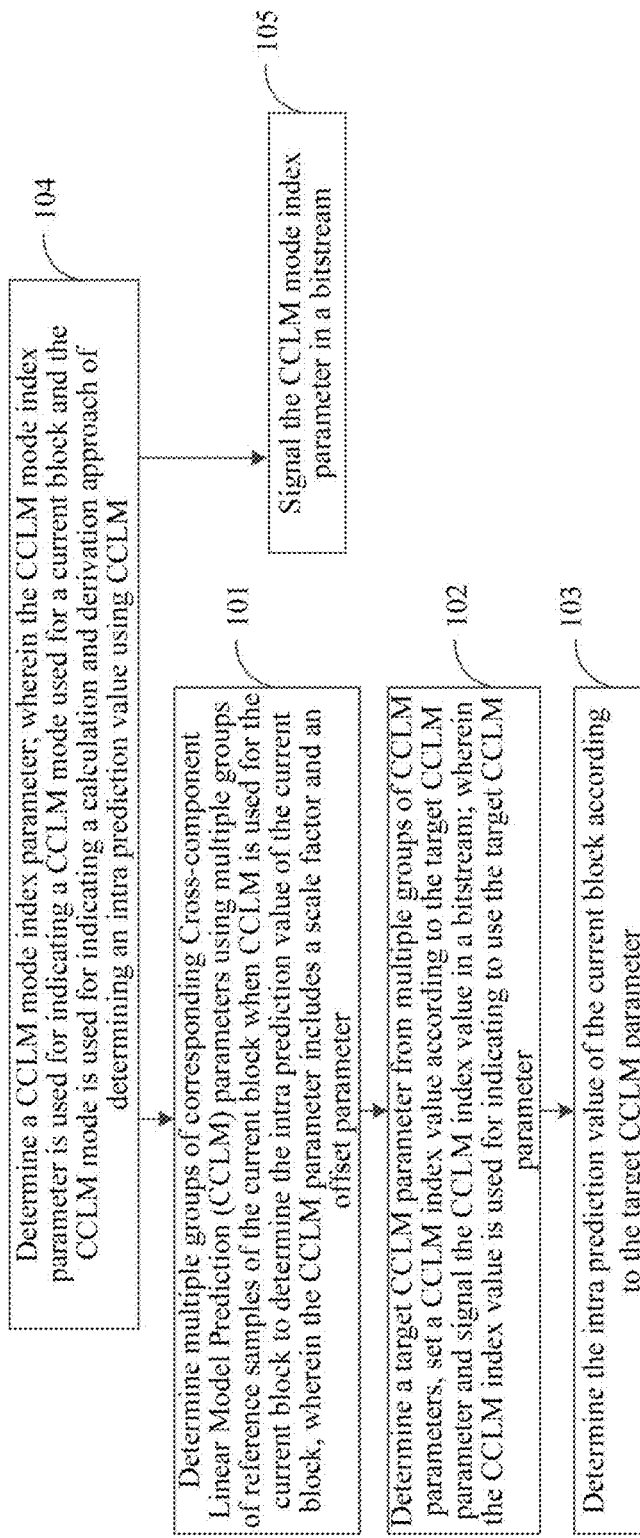
FIG. 4 is a second flowchart of an implementation of a method for predicting a colour component.

FIG. 4 is a second flowchart of an implementation of a method for predicting a colour component. As shown in FIG. 4, in the present application, before an encoder determines multiple groups of corresponding CCLM parameters using multiple groups of reference samples of a current block, that is, before the act 101, a method for the encoder to predict a colour component may further include the following acts.

In act 104, a CCLM mode index parameter is determined; wherein the CCLM mode index parameter is used for indicating a CCLM mode used for a current block and the CCLM mode is used for indicating a calculation and derivation approach of determining an intra prediction value using CCLM.

In act 105, the CCLM mode index parameter is signalled in a bitstream.

In an embodiment of the present application, an encoder may first determine a CCLM mode index parameter of a current block, and then determine a CCLM mode used for the current block using the CCLM mode index parameter, so that a calculation and derivation approach of determining an intra prediction value of the current block using CCLM may be obtained.

It may be understood that in an embodiment of the present application, a CCLM mode may specifically include multiple different intra prediction modes, so an encoder needs to calibrate and distinguish different prediction modes in the CCLM mode using different index parameters. That is to say, different CCLM modes correspond to different CCLM mode index parameters.

Further, in the present application, after determining a CCLM mode used for a current block, an encoder may determine a calculation and derivation approach of an intra prediction value of the current block according to the CCLM mode, and at the same time, may determine a CCLM mode index parameter corresponding to the CCLM mode.

Further, in an embodiment of the present application, an encoder may set a value of a CCLM mode index parameter as a CCLM mode indicating a current block to use, and the CCLM mode index parameter is signalled in a bitstream and transmitted to a decoding side, which is convenient for a decoder to obtain the CCLM mode index parameter by parsing the bitstream later, so that the decoder determines a CCLM mode indicated by the CCLM mode index parameter.

An embodiment of the present application provides a method for predicting a colour component. According to the method for predicting the colour component, when CCLM is used for a current block to determine an intra prediction value of the current block, an encoder determines multiple groups of corresponding CCLM parameters using multiple groups of reference samples of the current block, wherein a CCLM parameter includes a scale factor and an offset parameter. The encoder determines a target CCLM parameter from the multiple groups of CCLM parameters, and sets a CCLM index value according to the target CCLM parameter and signals the CCLM index value in a bitstream, wherein the CCLM index value is used for indicating to use the target CCLM parameter. The encoder determines the intra prediction value of the current block according to the target CCLM parameter. It can be seen that in the embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined using the target CCLM parameter. That is to say, according to a method for predicting a colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

Figure 5:
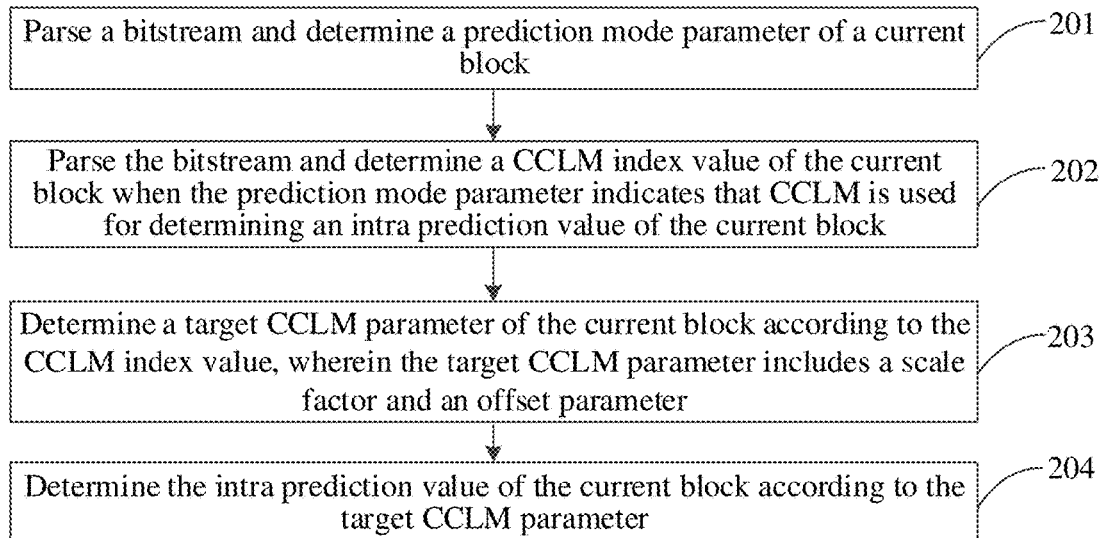
FIG. 5 is a third flowchart of an implementation of a method for predicting a colour component.

Based on the above embodiments, another embodiment of the present application provides a method for predicting a colour component, which is applied to a decoder. FIG. 5 is a third flowchart of an implementation of a method for predicting a colour component. As shown in FIG. 5, a method for a decoder to predict a colour component may include the following acts.

In act 201, a bitstream is parsed and a prediction mode parameter of a current block is determined.

In an embodiment of the present application, a decoder may parse a bitstream to determine a prediction mode parameter of a current block. Specifically, a decoder may further determine an intra prediction mode used for a current block according to a value of the prediction mode parameter, that is, in the present application, the prediction mode parameter may indicate a coding mode of the current block and a parameter related to this mode.

Further, in an embodiment of the present application, a coding mode may include two categories: a traditional intra prediction mode and a non-traditional intra prediction mode. Specifically, the traditional intra prediction mode may include a DC mode, a PLANAR mode, an angular mode, etc. The non-traditional intra prediction mode may include a MIP mode, a CCLM mode, an IBC mode, a PLT mode, etc.

That is to say, in an embodiment of the present application, a decoder may determine a coding mode of a current block is which specific coding mode included in a traditional intra prediction mode or included in a non-traditional intra prediction mode through a prediction mode parameter.

In an embodiment of the present application, further, on an encoding side, when determining a prediction mode parameter of a current block, an encoder may first determine a colour component to be predicted of the current block; then, based on a parameter of the current block, the colour component to be predicted is predicted and encoded using multiple prediction modes respectively, and a rate distortion cost result corresponding to each prediction mode in the multiple prediction modes is calculated; finally, a minimum rate distortion cost result may be selected from calculated multiple rate distortion cost results, and a prediction mode corresponding to the minimum rate distortion cost result is determined as the prediction mode parameter of the current block. That is to say, on an encoder side, for a current block, multiple prediction modes may be adopted to encode a colour component to be predicted respectively. Here, multiple prediction modes usually include a traditional intra prediction mode and a non-traditional intra prediction mode.

Further, in an embodiment of the present application, after the encoder sets the prediction mode corresponding to the minimum rate distortion cost result as the prediction mode parameter of the current block, the prediction mode parameter may be signalled in a bitstream by the encoder and transmitted to a decoding side, so that a decoder may obtain the prediction mode parameter of the current block by parsing the bitstream, and then the decoder may use the determined prediction mode to decode the current block. In this prediction mode, a prediction residual can be small and a decoding efficiency can be improved.

In act 202, the bitstream is parsed and a CCLM index value of the current block is determined when the prediction mode parameter indicates that CCLM is used for determining an intra prediction value of the current block.

In act 203, a target CCLM parameter of the current block is determined according to the CCLM index value, wherein the target CCLM parameter includes a scale factor and an offset parameter.

In an embodiment of the present application, after a decoder parses a bitstream and determines a prediction mode parameter of a current block, if the prediction mode parameter indicates to determine an intra prediction value of the current block using CCLM, the decoder may continue to parse the bitstream and determine a CCLM index value of the current block, and then may continue to determine a target CCLM parameter of the current block according to the CCLM index value.

It may be understood that in the present application, a CCLM index value is used for indicating that a target CCLM parameter is used for a current block to determine an intra prediction value of the current block. The target CCLM parameter includes a scale factor and an offset parameter.

It should be noted that in an embodiment of the present application, a scale factor may be $\alpha$ in the above formula (1), and an offset parameter may be $\beta$ in the above formula (1).

Further, in an embodiment of the present application, when a decoder determines a target CCLM parameter of a current block according to a CCLM index value, the decoder may first determine a target reference sample of the current block according to the CCLM index value; and then determine the target CCLM parameter of the current block according to the target reference sample.

It should be noted that in an embodiment of the present application, a target reference sample may be one or more pixel sampling points adjacent to a current block. Specifically, there are multiple groups of reference samples for a current block, and the target reference sample may be one group of reference samples in the multiple groups of reference samples.

It may be understood that in the present application, when a decoder determines a target reference sample of a current block according to a CCLM index value, the decoder may determine the target reference sample from multiple groups of reference samples of the current block according to the CCLM index value.

It should be noted that in an embodiment of the present application, multiple groups of reference samples of a current block may include pixel sampling points adjacent to the current block, and accordingly, each group of reference samples in the multiple groups of reference samples of the current block may include pixel sampling point(s) at one or more preset positions adjacent to the current block.

Specifically, in the present application, when a decoder determines a target reference sample from multiple groups of reference samples in a current block according to a CCLM index value, the decoder may first determine position information of each group of reference samples in the multiple groups of reference samples; and then, according to the position information of each group of reference samples, determine multiple distance parameters between the multiple groups of reference samples and the current block. After that, according to an order of distance parameters from small to large, the decoder may set a position index number of each group of reference samples in the multiple groups of reference samples sequentially. At last, the decoder may select a group of reference samples with the same position index number as an index number indicated by the CCLM index value as target reference samples from the multiple groups of reference samples.

That is to say, in the present application, a decoder may first calculate position information of each group of reference samples in multiple groups of reference samples respectively, that is, any one group of reference samples in the multiple groups of reference samples corresponds to one piece of position information. Then the decoder calculates to obtain multiple distance parameters between the multiple groups of reference samples and a current block according to the position information of each group of reference samples in the multiple groups of reference samples, respectively, that is, any one group of reference samples in the multiple groups of reference samples corresponds to one distance parameter. Next, the decoder may sort the multiple distance parameters, for example, sort the multiple distance parameters from small to large to obtain sorted distance parameters, and accordingly, the decoder may set a position index number of each group of reference samples in the multiple groups of reference samples according to the sorted distance parameters. Specifically, based on a correspondence between multiple groups of reference samples and multiple groups of distance parameters, a decoder may sequentially set a position index number of each group of reference samples in multiple groups of reference samples according to sorted distance parameters.

Further, in an embodiment of the present application, an encoder in an encoding end sets an index number of each group of CCLM parameters in multiple groups of CCLM parameters sequentially according to sorted distance parameters based on a correspondence among multiple groups of reference samples, multiple groups of CCLM parameters, and multiple groups of distance parameters, while a decoder in a decoding end sets a position index number of each group of reference samples in multiple groups of reference samples sequentially according to sorted distance parameters based on a correspondence between multiple groups of reference samples and multiple groups of distance parameters. Therefore, there is a mapping relationship between an index number of CCLM parameters of a group of reference samples and a position index number of the group of reference samples. Further, a decoder may select target reference samples from multiple groups of reference samples according to an index number indicated by a CCLM index value after obtaining the CCLM index value by parsing.

Exemplarily, in the present application, if an index number indicated by a CCLM index value obtained by a decoder through parsing a bitstream is 5, then the decoder may determine a group of reference samples with the position index number of 5 in multiple groups of reference samples as target reference samples.

In an embodiment of the present application, further, when a decoder determines the target CCLM parameter of a current block according to a CCLM index value, the decoder may use multiple groups of reference samples of the current block to determine multiple groups of corresponding CCLM parameters; and then use a group of CCLM parameters indicated by the CCLM index value in the multiple groups of CCLM parameters as the target CCLM parameter.

It may be understood that in the present application, multiple groups of reference samples of a current block may include pixel sampling points adjacent to the current block, and accordingly, each group of reference samples in the multiple groups of reference samples of the current block may include pixel sampling point(s) at one or more preset positions adjacent to the current block.

Specifically, in the present application, when a decoder uses a group of CCLM parameters indicated by a CCLM index value in the multiple groups of CCLM parameters as the target CCLM parameter, the decoder may first determine position information of each group of reference samples in the multiple groups of reference samples. Then, according to the position information of each group of reference samples, the decoder may determine multiple distance parameters between the multiple groups of reference samples and the current block. Further, according to an order of distance parameters from small to large, the decoder may set an index number of each group of CCLM parameters in the multiple groups of CCLM parameters sequentially. At last, a group of CCLM parameters with the same index number as that indicated by the CCLM index value in CCLM parameters may be used as the target CCLM parameter.

That is to say, in the present application, a decoder may first calculate position information of each group of reference samples in multiple groups of reference samples respectively, that is, any one group of reference samples in the multiple groups of reference samples corresponds to one piece of position information. Then the decoder calculates to obtain multiple distance parameters between the multiple groups of reference samples and a current block according to the position information of each group of reference samples in the multiple groups of reference samples, respectively, that is, any one group of reference samples in the multiple groups of reference samples corresponds to one distance parameter. Next, the decoder may sort the multiple distance parameters, for example, sort the multiple distance parameters in an order from small to large to obtain sorted distance parameters, and accordingly, the decoder may set an index number of each group of CCLM parameters in multiple groups of CCLM parameters according to the sorted distance parameters. Specifically, based on a correspondence among multiple groups of reference samples, multiple groups of CCLM parameters, and multiple groups of distance parameters, the decoder may sequentially set an index number of each group of CCLM parameters in the multiple groups of CCLM parameters according to sorted distance parameters.

Further, in an embodiment of the present application, an encoder in an encoding end sets an index number of each group of CCLM parameters in multiple groups of CCLM parameters sequentially according to sorted distance parameters based on a correspondence among multiple groups of reference samples, multiple groups of CCLM parameters, and multiple groups of distance parameters, while a decoder in a decoding end also sets an index number of each group of CCLM parameters in multiple groups of CCLM parameters according to sorted distance parameters based on a correspondence among multiple groups of reference samples, multiple groups of CCLM parameters, and multiple groups of distance parameters. Therefore, after obtaining a CCLM index value by parsing, the decoder selects a group of corresponding CCLM parameters from multiple groups of CCLM parameters as the target CCLM parameter according to an index number indicated by the CCLM index value.

Exemplarily, in the present application, if an index number indicated by a CCLM index value obtained by a decoder through parsing a bitstream is 3, then the decoder may determine a group of reference samples with the index number of 3 in multiple groups of CCLM parameters as target reference samples.

In act 204, the intra prediction value of the current block is determined according to the target CCLM parameter.

In an embodiment of the present application, after determining the target CCLM parameter of the current block according to the CCLM index value, the decoder may further determine an intra prediction value of the current block according to the target CCLM parameter.

It may be understood that in the present application, after determining the target CCLM parameter used for the current block, the decoder may further determine an intra prediction value of the current block using the target CCLM parameter, so that a prediction difference between the current block and the intra prediction value may be calculated.

Exemplarily, in an embodiment of the present application, a target CCLM parameter includes a scale factor and offset parameter used in intra prediction of a current block. Therefore, when determining the intra prediction value of the current block according to the target CCLM parameter, the decoder may calculate to obtain a prediction value $Pred_C[i,j]$ of a second colour component of a sampling point whose position coordinate is [i, j] in a coding block using a reconstruction value $Rec_L[i,j]$ of a first colour component of a sampling point (after down-sampling) whose position coordinate is [i, j] in the coding block according to the above formula (1).

Exemplarily, in an embodiment of the present application, after determining an intra prediction value of a current block, the decoder may continue to calculate a difference between a real pixel value of the current block and the intra prediction value, and take the calculated difference as a prediction difference, which is convenient for a transform processing on the prediction difference later.

That is to say, in an embodiment of the present application, when the decoder determines the intra prediction value of the current block according to the target CCLM parameter, the decoder may use a linear model to calculate a prediction value of a second colour component of the current block according to the target CCLM parameter and a reconstruction value of a first colour component of the current block.

Specifically, in the present application, the first colour component is a luma component; and the second colour component is a chroma component.

Figure 6:
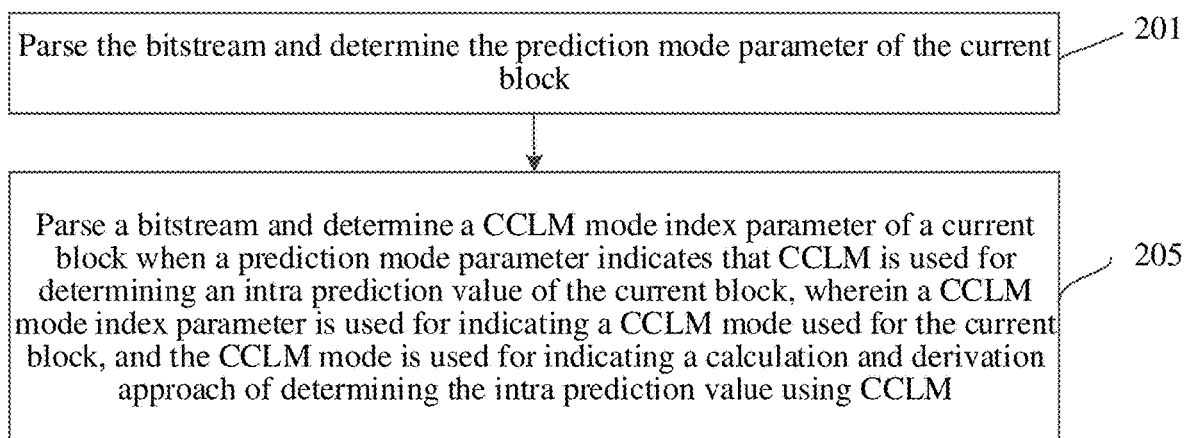
FIG. 6 is a fourth flowchart of an implementation of a method for predicting a colour component.

FIG. 6 is a fourth flowchart of an implementation of a method for predicting a colour component. As shown in FIG. 6, in the present application, after a decoder parses a bitstream to determine a prediction mode parameter of a current block, that is, after the act 201, a method for the decoder to predict a colour component may further include the following act.

In act 205, a bitstream is parsed and a CCLM mode index parameter of a current block is determined when a prediction mode parameter indicates that CCLM is used for determining an intra prediction value of the current block, wherein the CCLM mode index parameter is used for indicating a CCLM mode used for the current block, and the CCLM mode is used for indicating a calculation and derivation approach of determining an intra prediction value using CCLM.

In an embodiment of the present application, if a prediction mode parameter indicates that CCLM is used for determining an intra prediction value of a current block, a decoder may continue to parse a bitstream and determine a CCLM mode index parameter of the current block.

It should be noted that, in an embodiment of the present application, a CCLM mode index parameter is used for indicating a CCLM mode used for a current block, and the CCLM mode is used for indicating a calculation and derivation approach of determining an intra prediction value using CCLM.

That is to say, in the present application, after a decoder parses a bitstream, the decoder may first determine a CCLM mode index parameter of a current block, and then determine a CCLM mode used for the current block using the CCLM mode index parameter, so that a calculation and derivation approach of determining an intra prediction value of the current block using CCLM may be obtained.

It may be understood that in an embodiment of the present application, a CCLM mode may specifically include multiple different intra prediction modes, so an encoder needs to calibrate and distinguish different prediction modes in the CCLM mode using different index parameters. That is to say, different CCLM modes correspond to different CCLM mode index parameters.

Further, in the present application, after determining that CCLM is used for a current block to determine an intra prediction value, a decoder may determine a calculation and derivation approach of the intra prediction value of the current block according to a CCLM mode indicated by a CCLM mode index parameter.

An embodiment of the present application provides a method for predicting a colour component. According to the method for predicting the colour component, a decoder parses a bitstream and determines a prediction mode parameter of a current block; the bitstream is parsed and a CCLM index value of the current block is determined when the prediction mode parameter indicates to determine an intra prediction value of the current block using CCLM; a target CCLM parameter of the current block is determined according to the CCLM index value, wherein the target CCLM parameter includes a scale factor and an offset parameter; and the intra prediction value of the current block is determined according to the target CCLM parameter. It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined using the target CCLM parameter. That is to say, according to the method for predicting the colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

Figure 7:
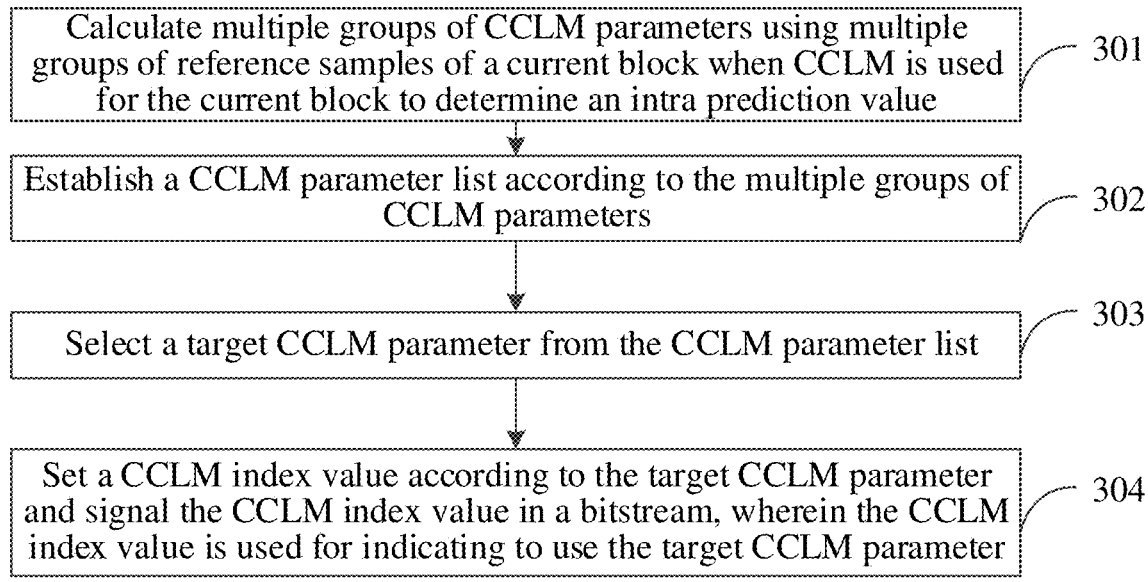
FIG. 7 is a fifth flowchart of an implementation of a method for predicting a colour component.

Based on the above embodiments, another embodiment of the present application provides a method for predicting a colour component, which is applied to an encoder. FIG. 7 is a fifth flowchart of an implementation of a method for predicting a colour component. As shown in FIG. 7, a method for an encoder to predict a colour component may include the following acts.

In act 301, multiple groups of CCLM parameters are calculated using multiple groups of reference samples of a current block when CCLM is used for the current block to determine an intra prediction value.

In act 302, a CCLM parameter list is established according to the multiple groups of CCLM parameters.

In act 303, a target CCLM parameter is selected from the CCLM parameter list.

In act 304, a CCLM index value is set according to the target CCLM parameter and signalled in a bitstream, wherein the CCLM index value is used for indicating to use the target CCLM parameter.

In an embodiment of the present application, an encoder partitions a picture in an input video into one or more Coding Tree Units (CTUs), that is, partitions the picture into tiles, and optionally further partitions the tiles into one or more bricks, wherein each of the tiles and bricks includes one or more complete and/or partial CTUs to form one or more slices. The slice may include one or more tiles in a raster order of the tiles in the picture or one or more tiles covering a rectangular region in the picture, and may also form one or more sub-pictures, wherein the sub-picture includes one or more slices, tiles, or bricks.

Further, in an embodiment of the present application, an encoder may continue to iteratively use quadtree split, binary split, and ternary split on partitioned CTUs, and further partition a CTU into smaller Coding Units (CUs). A motion compensation unit and a motion estimation unit may be used for obtaining an inter current block of a CU. An intra prediction unit is used for determining an intra prediction mode to be used for encoding a video coding block, and various intra prediction modes including a MIP mode may be used for obtaining an intra prediction block of a CU. In an example, a motion estimation approach of Rate Distortion Optimization may be called by the motion compensation unit and the motion estimation unit to obtain an inter current block, and a mode determination approach of Rate Distortion Optimization may be called by the intra prediction unit to obtain an intra prediction block. An intra prediction module 103 determines whether a CCLM mode (including intra prediction modes whose mode index is equal to INTRA_LT_CCLM, INTRA_L_CCLM, and INTRA_T_CCLM, respectively) is used for obtaining the intra prediction block.

Further, in an embodiment of the present application, an encoder may select a current block from an inter current block and an intra prediction block, and transmit the current block, and at the same time, may also transmit a mode parameter of a corresponding mode of the selected current block. Specifically, multiple groups of CCLM parameters are calculated using multiple groups of reference samples of a current block when CCLM is used for the current block to determine an intra prediction value. The multiple groups of reference samples include pixel sampling points adjacent to the current block.

It should be noted that in an embodiment of the present application, when the selected current block is obtained using a CCLM mode, a CCLM mode parameter used when an intra prediction block is obtained may be transmitted to a coding unit. If flexible CCLM reference is enabled, the CCLM mode parameter includes a CCLM mode index parameter and a CCLM index value.

Figure 8:
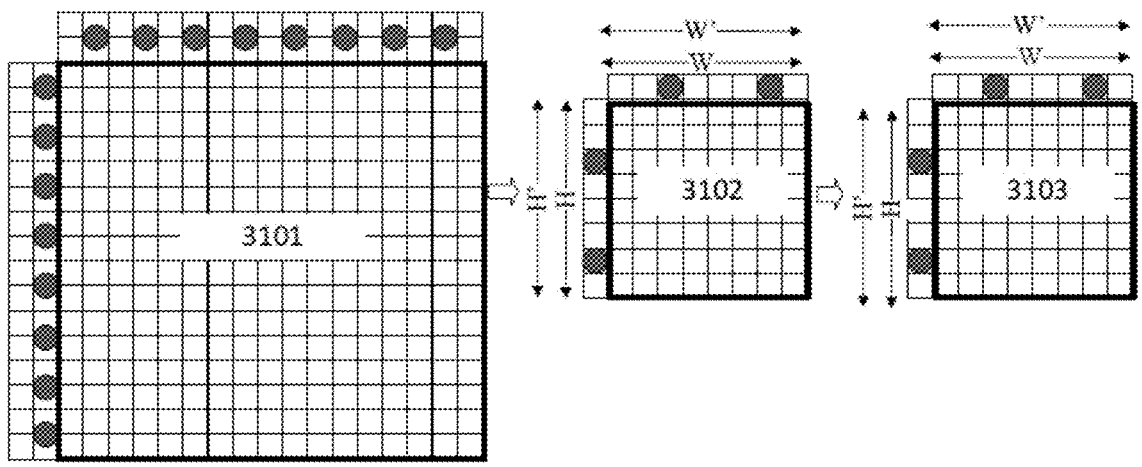
FIG. 8 is a first schematic diagram of a position of a reference sample of a current block.
Figure 9:
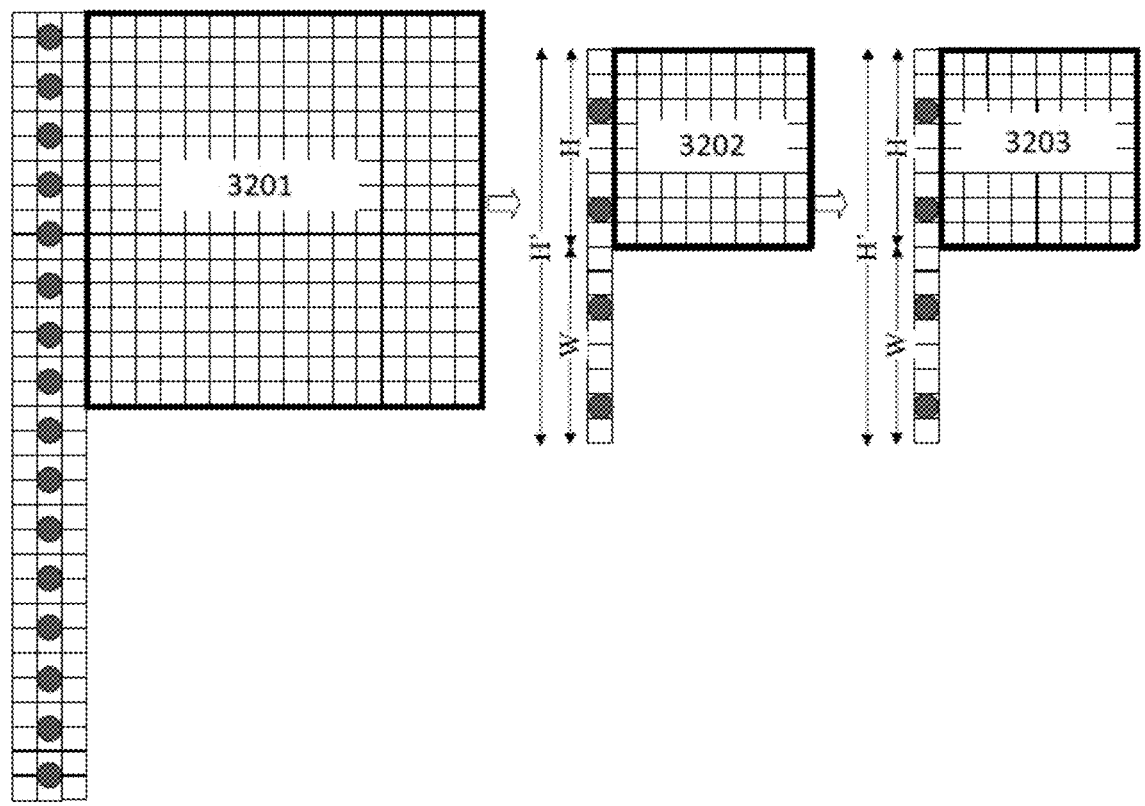
FIG. 9 is a second schematic diagram of a position of a reference sample of a current block.
Figure 10:
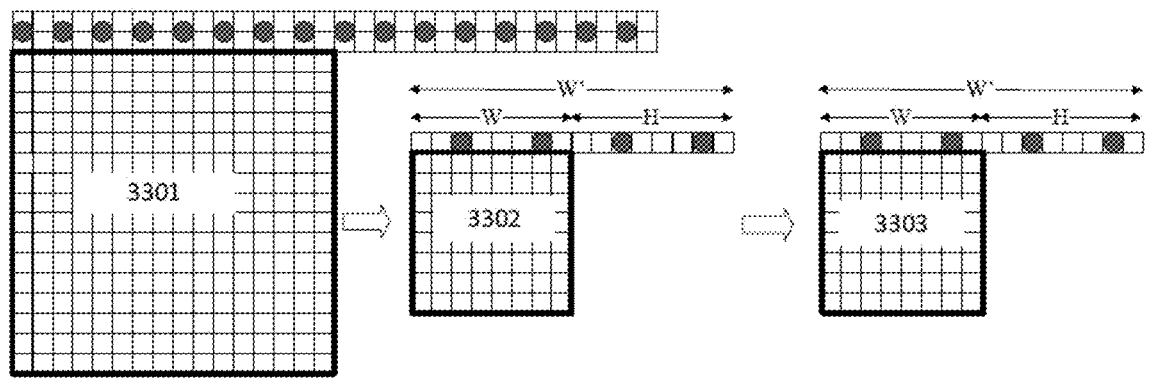
FIG. 10 is a third schematic diagram of a position of a reference sample of a current block.

FIG. 8 is a first schematic diagram of a position of a reference sample of a current block, FIG. 9 is a second schematic diagram of a position of a reference sample of a current block, FIG. 10 is a third schematic diagram of a position of a reference sample of a current block. FIGS. 8 to 10 respectively show examples of obtaining a position of a reference sample of a current block in an INTRA_LT_CCLM mode, an INTRA_L_CCLM mode, and an INTRA_T_CCLM mode, wherein the position of the reference sample is marked by a black dot. Blocks 3101, 3201, and 3301 include reference samples of the luma component of the current block, blocks 3102, 3202, and 3302 include reference samples of the first chroma component (such as Cb or U component) of the current block, and blocks 3103, 3203, and 3303 include reference samples of the second chroma component (such as Cr or V component) of the current block.

Further, in an embodiment of the present application, an encoder may determine a position of a reference sample using a width W and height H of a block (marked as W(W')

and H(H') in FIGS. 2A to 2C) and two parameters (i.e., a starting position s and a step length Δ).

Further, in an embodiment of the present application, an encoder may calculate a value of Δ through Δ=L/(N/2), wherein L represents a quantity of reference samples in an upper adjacent position of a current block or a quantity of reference samples in a left adjacent position of a current block; N represents a quantity of neighboring samples expected to be used for establishing a subset of reference samples. The encoder calculates a value of s through s=Δ/2.

Figure 11:
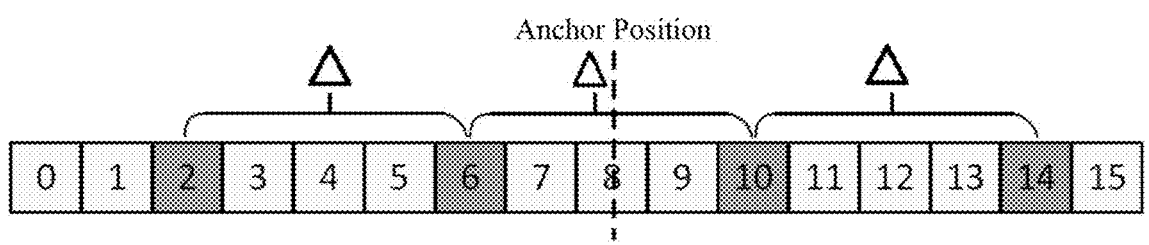
FIG. 11 is a schematic diagram of determining a position of a reference sample of an INTRA_T_CCLM mode.

FIG. 11 is a schematic diagram for determining a position of a reference sample in an INTRA_T_CCLM mode. As shown in FIG. 11, assuming L is equal to 16, N is equal to 8 and a quantity of reference samples is equal to 4, then an encoder calculates Δ to obtain Δ=L/(N/2)=16/(8/2)=4, and calculates s to obtain s=Δ/2=4/2=2. That is, the encoder determines that a starting position of a reference sample is at a sample position 2 in FIG. 11, and a step length to reach a position of a next adjacent reference sample is equal to 4. The encoder obtains reference samples from sample positions 2, 6, 10, and 14 to form a subset of reference samples.

It should be noted that, in an embodiment of the present application, a CCLM parameter obtained by an encoder through using obtained reference samples may include a scale factor and an offset parameter, that is, the scale factor α and the offset parameter β in the above formula (1).

Further, in an embodiment of the present application, an encoder may obtain one or more different values of CCLM parameters (α and β) by changing a position of a reference sample, that is, the encoder may determine multiple groups of corresponding CCLM parameters using multiple groups of reference samples of a current block. When using multiple groups of positions to obtain different CCLM parameters, the encoder may select a target CCLM parameter from the multiple groups of CCLM parameters (for example, using a mode determination approach of Rate Distortion Optimization).

It should be noted that in an embodiment of the present application, an encoder may indicate a target CCLM parameter through a syntax setting, and at the same time, it may also indicate whether to allow multiple groups of CCLM parameters through a syntax setting.

Exemplarily, in the present application, Table 1 is syntax one of CCLM. As shown in Table 1, an encoder may indicate a target CCLM parameter by setting a CCLM index value cclm_ref_index, that is, set the cclm_ref_index in Table 1 to indicate the target CCLM parameter.

TABLE 1

| | Descriptor |
|---|---|
| coding_unit ( x0, y0, cbWidth, cbHeight, treeType ) { ...... if ( (IntraPredModeY[ x0 ][ y0] == INTRA_LT_CCLM) \|\| (IntraPredModeY[ x0 ][ y0] == INTRA_L_CCLM) \|\| (IntraPredModeY[ x0 ][ y0] == INTRA_T_CCLM) ) CCLM_ref_index ...... } | ae (v) |

Exemplarily, in the present application, Table 2 is syntax two of CCLM. As shown in Table 2, an encoder may determine whether to allow multiple groups of CCLM parameters by setting cclm_multiple_ref_enable_flag.

TABLE 2

| | Descriptor |
|---|---|
| ...... CCLM_multiple_ref_enable_flag ...... | u (1) |

Further, in an embodiment of the present application, after obtaining multiple groups of reference samples of a current block, an encoder may call the act 301 to calculate multiple groups of CCLM parameters using the multiple groups of reference samples. Then, the act 302 may be called to establish a CCLM parameter list according to the multiple groups of CCLM parameters.

Exemplarily, in the present application, Table 3 is syntax three of CCLM. As shown in Table 3, an encoder may assign cclm_ref_index to CCLM parameters in a CCLM parameter list, wherein the CCLM parameter includes a scale factor α and an offset parameter β.

TABLE 3

| | alpha[0] offset[0] | alpha[1] offset[1] | alpha[2] offset[2] | ... |
|---|---|---|---|---|
| cclm_ref_index | 0 | 1 | 2 | ... |

Further, in an embodiment of the present application, an encoder may call the act 303 to select a target CCLM parameter from a CCLM parameter list.

Exemplarily, in the present application, an encoder determines a cost value of a corresponding CCLM parameter in a CCLM parameter list, that is, using a Rate Distortion Optimization approach, and then determines a CCLM parameter with an optimal cost as a target CCLM parameter.

Further, in an embodiment of the present application, an encoder may call the act 304 to set cclm_ref_index to be equal to an index number of a target CCLM parameter in a CCLM parameter list.

Figure 12:
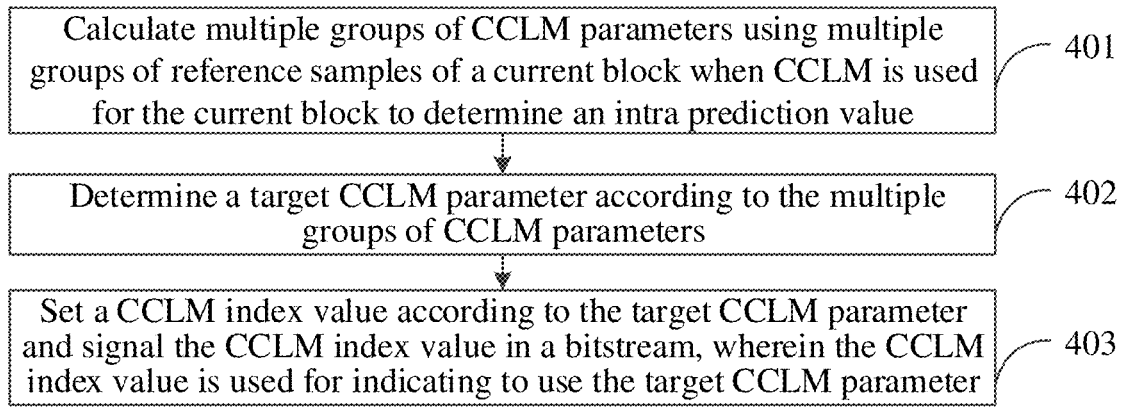
FIG. 12 is a sixth flowchart of an implementation of a method for predicting a colour component.

In an embodiment of the present application, further, FIG. 12 is a sixth flowchart of an implementation of a method for predicting a colour component. As shown in FIG. 12, the method for an encoder to predict a colour component may include the following acts.

In act 401, multiple groups of CCLM parameters are calculated using multiple groups of reference samples of a current block when CCLM is used for the current block to determine an intra prediction value.

In act 402, a target CCLM parameter is determined according to the multiple groups of CCLM parameters.

In act 403, a CCLM index value is set according to the target CCLM parameter and signalled in a bitstream, wherein the CCLM index value is used for indicating to use the target CCLM parameter.

It may be understood that in an embodiment of the present application, since multiple groups of CCLM parameters (i.e., scale factors and offset parameters) of a current block are determined through multiple groups of reference samples of the current block, an encoder may also express the CCLM parameter as a position of a reference sample extracted through corresponding s and Δ.

Exemplarily, in the present application, Table 4 shows an example of a reference position of a CCLM model. As shown in Table 4, INTRA_LT_CCLM, INTRA_L_CCLM, and INTRA_T_CCLM may be three consecutive positive integers; IntraPredModeY[x0][y0] indicates an intra prediction mode of a current block in a case where a position of a luma sample on a top left side of the current block is equal to (x0, y0) in a picture or sub-picture; and values of cclm_ref_index correspond to various s and Δ parameters to determine reference samples and then determine CCLM parameters. In a called Rate Distortion Optimization process, a position of a reference sample may be expressed as s=cclmRefPosition[x0][y0][IntraPredModeY[x0][y0]−INTRA_LT_CCLM][cclm_ref_index][0], and Δ=cclmRefPosition[x0][y0][IntraPredModeY[x0][y0]−INTRA_LT_CCLM][cclm_ref_index][1].

TABLE 4

| IntraPredModeY[x0][y0] | cclm_ref_index | CCLM Reference Position |
|---|---|---|
| INTRA_LT_CCLM | 0 | (s[0][0], delta[0][0]) |
|  | 1 | (s[0][1], delta[0][1]) |
|  | 2 | (s[0][2], delta[0][2]) |
|  | 3 | (s[0][3], delta[0][3]) |
|  | ... | ... |
| INTRA_L_CCLM | 0 | (s[1][0], delta[1][0]) |
|  | 1 | (s[1][1], delta[1][1]) |
|  | ... | ... |
| INTRA_T_CCLM | 0 | (s[2][0], delta[2][0]) |
|  | 1 | (s[2][1], delta[2][1]) |
|  | 2 | (s[2][2], delta[2][2]) |
|  | ... | ... |

Further, in an embodiment of the present application, an encoder may call the act 401 to obtain multiple groups of reference positions using s and Δ of multiple groups of reference samples, and then calculate to obtain multiple groups of corresponding CCLM parameters. The encoder may call the act 402 to determine an optimal CCLM mode using, for example, a method similar to the acts 302 and 303. At last, the encoder may set cclm_ref_index to be equal to an index number of a target CCLM parameter.

It should be noted that in an embodiment of the present application, various CCLM modes may have different quantities of candidate CCLM parameters. As shown in Table 4, for the three CCLM modes, i.e. INTRA_LT_CCLM, INTRA_L_CCLM, and INTRA_T_CCLM, quantities of subsets of reference positions represented by s and Δ may be different.

It should be noted that in an embodiment of the present application, when an encoder determines not to use multiple subsets of CCLM parameters, a reference sample may be obtained using a default position. An example of the default position is an example in FIG. 11.

Further, in an embodiment of the present application, an encoder calculates a residual according to an intra prediction value of a current block. For example, the encoder calculates a difference between a partitioned CU and a predicted block of the CU, that is, a residual CU. The encoder reads the residual CU and performs one or more transform operations on the residual CU to obtain a coefficient. An encoder quantizes the coefficient and outputs a quantized coefficient (i.e., a level).

Further, in an embodiment of the present application, an inverse quantization unit in an encoder performs a scaling operation on a quantized coefficient to output a reconstructed coefficient. An inverse transform unit performs one or more inverse transforms corresponding to the transform (s) in a transform unit and outputs a reconstructed residual. An adder calculates a reconstructed CU by adding the reconstructed residual and a prediction block of a CU from a prediction unit. The adder also sends its output to the prediction unit to be used as an intra prediction reference. A filtering unit performs loop filtering on a reconstructed picture or sub-picture after all CUs in the picture or sub-picture are reconstructed. The filtering unit includes one or more filters, such as a deblocking filter, a Sample Adaptive Offset (SAO) filter, an Adaptive Loop Filter (ALF), a Luma Mapping and Chroma Scaling (LMCS) filter, and a filter based on a neural network. Alternatively, when the filtering unit determines that a CU is not used as a reference for encoding other CUs, the filtering unit performs loop filtering on one or more target pixels in the CU.

An output of the filtering unit is a decoded picture or sub-picture, which is sent to a Decoded Picture Buffer (DPB). The DPB outputs a decoded picture according to timing and control information. A picture stored in the DPB may also be used as a reference for the prediction unit to perform inter prediction or intra prediction.

An entropy coding unit converts a parameter (necessary to obtain a decoded picture), a control parameter, and supplementary information from a unit in the encoder into binary representations, and such binary representations are signalled in a generated video bitstream according to a syntax structure of each data unit by the entropy coding unit.

The entropy coding unit encodes cclm_ref_index in Table 1 into a data unit corresponding to a current block in a bitstream, wherein in Table 1, ae(v) is an entropy coding approach corresponding to a parsing process of ae(v) detailed in VVC Working Draft (WD). Optionally, the encoder may also determine whether to allow use of multiple subsets of reference positions when determining a CCLM mode parameter by an intra prediction unit. The entropy coding unit may encode syntax elements in Table 2 into one or more subsequent data units in a bitstream, and the syntax elements include (from a higher level to a lower level) a sequence level parameter set, (such as a Sequence Parameter Set (SPS)), a picture or sub-picture level parameter set (such as a Picture Parameter Set (PPS)), an Adaptive Parameter Set (APS), a slice header, syntax of tiles in slice data, syntax of bricks in slice data, and a Coding Tree Unit (CTU). The entropy coding unit encodes cclm_multiple_ref_enable_flag using u(1). The u(1) is an entropy coding approach corresponding to a parsing process of u(1) detailed in VVC WD. Optionally, cclm_multiple_ref_enable_flag in a lower level may override a corresponding flag in a higher level.

An embodiment of the present application provides a method for predicting a colour component. According to the method for predicting the colour component, when CCLM is used for a current block to determine an intra prediction value of the current block, an encoder determines multiple groups of corresponding CCLM parameters using multiple groups of reference samples of the current block, wherein a CCLM parameter includes a scale factor and an offset parameter. The encoder determines a target CCLM parameter from the multiple groups of CCLM parameters, and sets a CCLM index value according to the target CCLM parameter and signals the CCLM index value in a bitstream, wherein the CCLM index value is used for indicating to use the target CCLM parameter. The encoder determines the intra prediction value of the current block according to the target CCLM parameter. It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters, and the encoder may signal a CCLM index value indicating to use a target CCLM parameter in a bitstream by the encoder and transmit the bitstream to a decoding side. Therefore, a decoder may obtain the CCLM index value after parsing the bitstream, and determine the target CCLM parameter indicated by the CCLM index value, so that the decoder may determine the intra prediction value of the current block using the target CCLM parameter. That is to say, according to the method for predicting the colour component provided in the present application, the target CCLM parameter in multiple groups of CCLM parameters of the current block may be signalled in a bitstream for transmission, so that the decoder may determine to perform an intra prediction processing on the current block according to the target CCLM parameter, which greatly reduces complexity of encoding and decoding processing and improves encoding and decoding efficiency.

Figure 13:
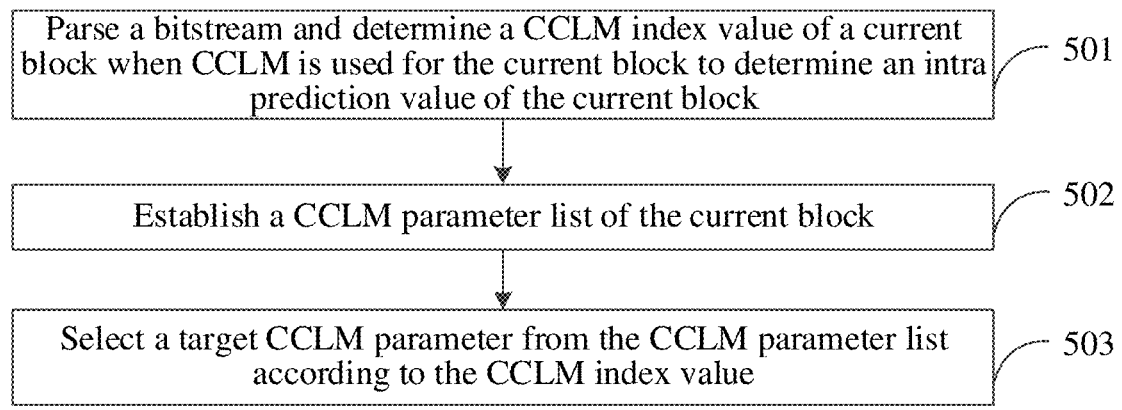
FIG. 13 is a seventh flowchart of an implementation of a method for predicting a colour component.

Based on the above embodiments, another embodiment of the present application provides a method for predicting a colour component, which is applied to a decoder. FIG. 13 is a seventh flowchart of an implementation of a method for predicting a colour component. As shown in FIG. 13, a method for a decoder to predict a colour component may include the following acts.

In act 501, a bitstream is parsed and a CCLM index value of a current block is determined when CCLM is used for the current block to determine an intra prediction value of the current block.

In act 502, a CCLM parameter list of the current block is established.

In act 503, a target CCLM parameter is selected from the CCLM parameter list according to the CCLM index value.

In an embodiment of the present application, an input bitstream of a decoder may be a bitstream generated by an encoder, which is a bit stream. A parsing unit of the decoder parses the input bitstream and obtains values of syntax elements from the input bitstream. The parsing unit of the decoder converts binary representations of syntax elements into digital values and sends the digital values to a unit in the decoder to obtain one or more decoded pictures. The parsing unit of the decoder may also parse one or more syntax elements from the input bitstream to display a decoded picture.

Further, in an embodiment of the present application, a parsing unit of a decoder may obtain one or more syntax elements indicating position(s) of reference sample(s) of a current block.

Exemplarily, in the present application, a parsing unit of a decoder may obtain cclm_ref_index from a data unit in an input bitstream, wherein the data unit may be at least one of a slice header, a parameter set, slice data, a supplementary enhancement information message, etc.

Specifically, in the present application, a syntax structure of a CCLM index value cclm_ref_index in the input bitstream is shown in Table 1 above. A parsing unit of a decoder uses an entropy coding approach corresponding to ae(v) to convert a binary representation in the bitstream into a digital value of cclm_ref_index.

It may be understood that, in an embodiment of the present application, a decoder may first parse a bitstream and determine a prediction mode parameter of a current block.

Exemplarily, in the present application, before parsing the CCLM_ref_index, the parsing unit of the decoder may first obtain a value of a syntax element indicating whether a position of a flexible reference sample is allowed to be used for a CCLM mode. For example, the parsing unit of the decoder obtains the syntax element, which is called a prediction mode parameter cclm_multiple_ref_enable_flag, for example, from an active parameter set directly or indirectly related to a slice containing a current block. If cclm_multiple_ref_enable_flag is equal to 1, and if a CCLM mode in a bitstream indicates an intra prediction mode for decoding the current block, the parsing unit of the decoder may obtain cclm_ref_index from coding bits of the current block. In addition, if cclm_multiple_ref_enable_flag is equal to 0, there is no cclm_ref_index in the current block part in an input bitstream because the CCLM mode is not used for decoding the current block.

Exemplarily, in the present application, the above Table 2 is used for representing a syntax structure of cclm_multiple_ref_enable_flag in one or more data units, and the data units include, for example, a parameter set, a slice header, slice data, a CTU, and a supplementary enhancement information message, and an input bitstream. A parsing unit of a decoder uses an entropy decoding approach corresponding to u(1) to convert a binary representation in the bitstream into a digital value of cclm_multiple_ref_enable_flag. Similar to an encoder, cclm_multiple_ref_enable_flag in a lower level may override a corresponding flag in a higher level.

Further, in an embodiment of the present application, a parsing unit of a decoder sends cclm_ref_index and other syntax elements for obtaining one or more decoded pictures to a prediction unit in the decoder to determine a prediction block of a current block (e.g., a CU). When an inter decoding mode is indicated to decode the current block, the prediction unit transmits a relative parameter from the parsing unit of the decoder to a Motion Compensation (MC) unit to obtain an inter prediction block. When an intra prediction mode (which can include a CCLM intra prediction mode) is indicated to decode the current block, the prediction unit transmits a relative parameter from the parsing unit of the decoder to an intra prediction unit to obtain an intra prediction block.

Further, in an embodiment of the present application, when a decoder determines to use a CCLM intra prediction mode, an intra prediction unit uses a same type of a CCLM mode as that shown in FIGS. 8 to 10 to obtain a prediction block of a current block. An obtaining process of an intra prediction block in decoder is similar to that in an encoder. The intra prediction unit obtains a position of a reference sample indicated by cclm_ref_index, calculates a CCLM parameter in a same way as a calculation approach of the intra prediction unit of the encoder, and finally calculates an intra prediction block of the current block using the linear model shown in the above formula (1).

It may be understood that in an embodiment of the present application, in the act 501, a parsing unit of a decoder performs bitstream parsing to obtain a CCLM index value cclm_ref_index from an input bitstream. After obtaining more than one subset of multiple groups of reference samples, an intra prediction unit calls the act 502 to calculate multiple groups of CCLM parameters corresponding to multiple groups of reference samples using subsets. When multiple groups of CCLM parameters are calculated, a sequence of subsets and position(s) of reference sample(s) in each subset are the same as those used by the intra prediction unit of the encoder. The intra prediction unit calls the act 502 to establish a CCLM parameter list.

Exemplarily, in the present application, as shown in Table 3 above, a decoder may also assign an index to a CCLM parameter in a CCLM parameter list, wherein the CCLM parameter includes a scale factor and an offset parameter. An intra prediction unit calls the act 503 to select a target CCLM parameter whose index number is equal to a value of cclm_ref_index in a CCLM parameter list (the target CCLM parameter includes a scale factor and an offset parameter).

Figure 14:
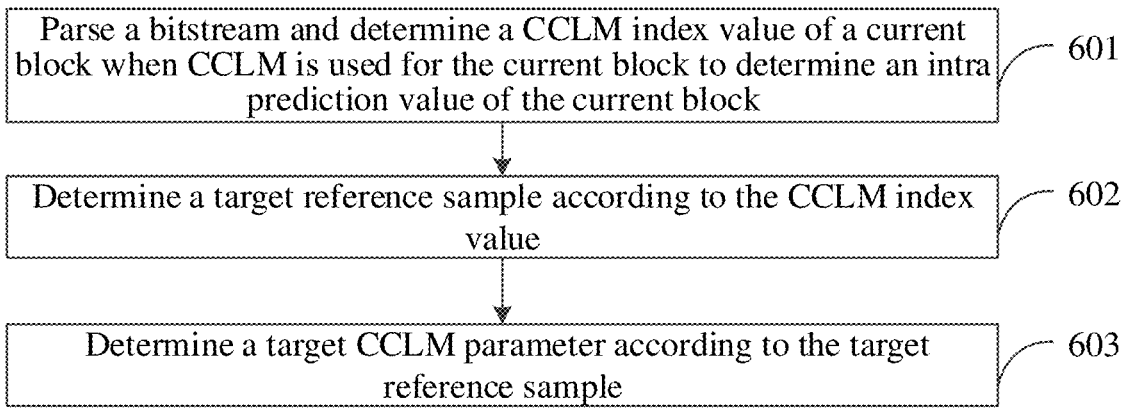
FIG. 14 is an eighth flowchart of an implementation of a method for predicting a colour component.

In an embodiment of the present application, further, FIG. 14 is an eighth flowchart of an implementation of a method for predicting a colour component. As shown in FIG. 14, the method for a decoder to predicting a colour component may include the following acts.

In act 601, a bitstream is parsed and a CCLM index value of a current block is determined when CCLM is used for the current block to determine an intra prediction value of the current block.

In act 602, a target reference sample is determined according to the CCLM index value.

In act 603, a target CCLM parameter is determined according to the target reference sample.

In an embodiment of the present application, since multiple groups of CCLM parameters (i.e., scale factors and offset parameters) of a current block are determined through multiple groups of reference samples of the current block, a decoder may also express CCLM parameters as positions of reference samples extracted through corresponding s and Δ.

Exemplarily, in the present application, as shown in Table 4 above, INTRA_LT_CCLM, INTRA_L_CCLM, and INTRA_T_CCLM may be three consecutive positive integers; IntraPredModeY[x0][y0] indicates an intra prediction mode of a current block in a case where a position of a luma sample on a top left side of the current block is equal to (x0, y0) in a picture or sub-picture; and values of cclm_ref_index correspond to various s and Δ parameters to determine reference samples and then determine CCLM parameters. In a called Rate Distortion Optimization process, a position of a reference sample may be expressed as s=cclmRefPosition[x0][y0][IntraPredModeY[x0][y0]−INTRA_LT_CCLM][cclm_ref_index][0], and Δ=cclmRefPosition[x0][y0][IntraPredModeY[x0][y0]−INTRA_LT_CCLM][cclm_ref_index][1].

It may be understood that in an embodiment of the present application, the act 601 is performed by a parsing unit of a decoder to obtain cclm_ref_index from an input bitstream. An intra prediction unit calls the act 602 to obtain a target reference sample using cclm_ref_index. As shown by an exemplary structure in Table 4, for a current block and a luma sample (x0, y0) on a top left side of the current block, the intra prediction unit determines the target reference sample and obtains s=cclmRefPosition[x0][y0][IntraPredModeY[x0][y0]−INTRA_LT_CCLM][cclm_ref_index][0], and Δ=CCLMRefPosition[x0][y0][IntraPredModeY[x0][y0]−INTRA_LT_CCLM][cclm_ref_index][1]. The intra prediction unit calls the act 603 to determine a position of the target reference sample, and then calculates a target CCLM parameter that includes a scale factor and an offset parameter and is used for decoding the current block.

It should be noted that in an embodiment of the present application, various CCLM modes may have different quantities of candidate CCLM parameters. As shown in Table 4, for the three CCLM modes, i.e. INTRA_LT_CCLM, INTRA_L_CCLM, and INTRA_T_CCLM, quantities of subsets of reference positions represented by s and Δ may be different.

It may be understood that in the present application, a scaling unit of a decoder has a same function as an inverse quantization unit in an encoder. The scaling unit of the decoder performs a scaling operation on a quantized coefficient (i.e., a level) from a parsing unit of the decoder to obtain a reconstructed coefficient. A transform unit of the decoder has a same function as an inverse transform unit in the encoder. The transform unit of the decoder performs one or more transform operations (i.e., an inverse operation of one or more transform operations performed by the inverse transform unit in the encoder) to obtain a reconstructed residual. An adder of the decoder performs an addition operation on its inputs (a current block from a prediction unit and a reconstructed residual from the transform unit of the decoder) to obtain a reconstructed block of the current block. The reconstructed block is also sent to the prediction unit to be used as a reference for other coding blocks in an intra prediction mode.

A filtering unit performs loop filtering on a reconstructed picture or sub-picture after all CUs in the picture or sub-picture are reconstructed. The filtering unit includes one or more filters, such as a deblocking filter, a Sample Adaptive Offset (SAO) filter, an Adaptive Loop Filter (ALF), a Luma Mapping and Chroma Scaling (LMCS) filter, and a filter based on a neural network. Alternatively, when the filtering unit determines that the reconstructed block is not used as a reference for decoding other blocks, the filtering unit performs loop filtering on one or more target pixels in the reconstructed block.

An output of the filtering unit is a decoded picture or sub-picture, which is sent to a Decoded Picture Buffer (DPB). The DPB outputs a decoded picture according to timing and control information. A picture stored in the DPB may also be used as a reference for performing inter prediction or intra prediction by the prediction unit.

An embodiment of the present application provides a method for predicting a colour component. According to the method for predicting the colour component, a decoder parses a bitstream and determines a prediction mode parameter of a current block; the decoder parses the bitstream and determines a CCLM index value of the current block when the prediction mode parameter indicates to determine an intra prediction value of the current block using CCLM; the decoder determines a target CCLM parameter of the current block according to the CCLM index value, wherein the target CCLM parameter includes a scale factor and an offset parameter; and the decoder determines the intra prediction value of the current block according to the target CCLM parameter. It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined using the target CCLM parameter. That is to say, according to the method for predicting the colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

Figure 15:
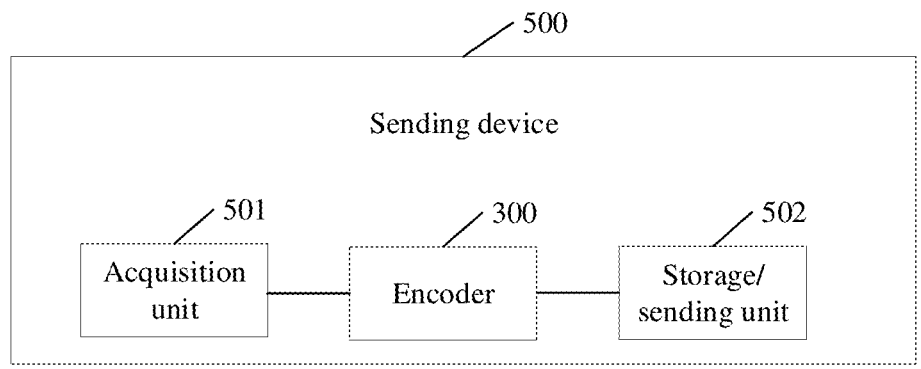
FIG. 15 is a schematic diagram of a structure of a sending device.

Based on the above embodiments, in another embodiment of the present application, FIG. 15 is a schematic diagram of a structure of a sending device. As shown in FIG. 15, the sending device 500 may include an acquisition unit 501, an encoder 300, and a storage/sending unit 502.

The acquisition unit 501 obtains a video signal and transmits the video signal to the encoder 300. The acquisition unit 501 may be a device including one or more cameras (including a depth camera). The acquisition unit 501 may be a device that partially or completely decodes a bitstream to obtain a video. The acquisition unit 501 may also include one or more elements to capture an audio signal. An embodiment of the encoder 300 is that an encoder encodes a video signal from the acquisition unit 501 as its input video and generates a video bitstream. The encoder 300 may further include one or more audio encoders to encode an audio signal to generate an audio bitstream. The storage/sending unit 502 receives a video bitstream from the encoder 300. The storage/sending unit 502 may also receive an audio bitstream from the encoder 300 and compress the video bitstream and the audio bitstream together to form a media file (e.g., an ISO-based media file format) or a transport stream. Optionally, the media file or transport stream is signalled in a storage unit, such as a hard disk, a DVD disk, a cloud, and a portable storage device, by the storage/sending unit 502. Optionally, the storage/sending unit 502 sends a bit stream to a transport network, such as the Internet, a wired network, a cellular network, and a wireless local area network.

Figure 16:
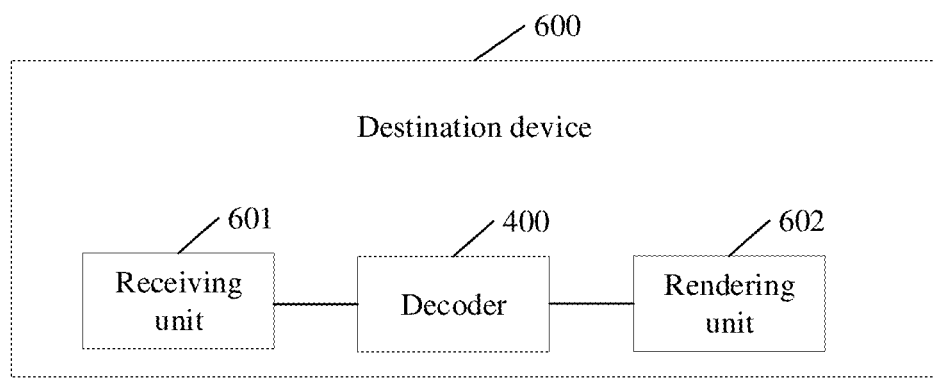
FIG. 16 is a schematic diagram of a structure of a destination device.

FIG. 16 is a schematic diagram of a structure of a destination device. As shown in FIG. 16, a destination device 600 may include a receiving unit 601, a decoder 400, and a rendering unit 602.

The receiving unit 601 receives a media file or transport stream from a network or reads a media file or transport stream from a storage device. The receiving unit 601 separates a video bitstream and an audio bitstream from the media file or transport stream. The receiving unit 601 may also generate a new video bitstream by extracting the video bitstream. The receiving unit 601 may also generate a new audio bitstream by extracting the audio bitstream. The decoder 400 decodes the video bitstream and the audio bitstream from the receiving unit 601 to obtain a decoded video and one or more decoded audios corresponding to one or more channels. The rendering unit 602 performs an operation on a reconstructed video to make it suitable for display. Such an operation may include one or more of the following operations to improve perceptual quality: noise reduction, synthesis, color space conversion, up-sampling, down-sampling, etc. The rendering unit 602 may also perform an operation on a decoded audio to improve perceptual quality of a displayed audio signal.

Figure 17:
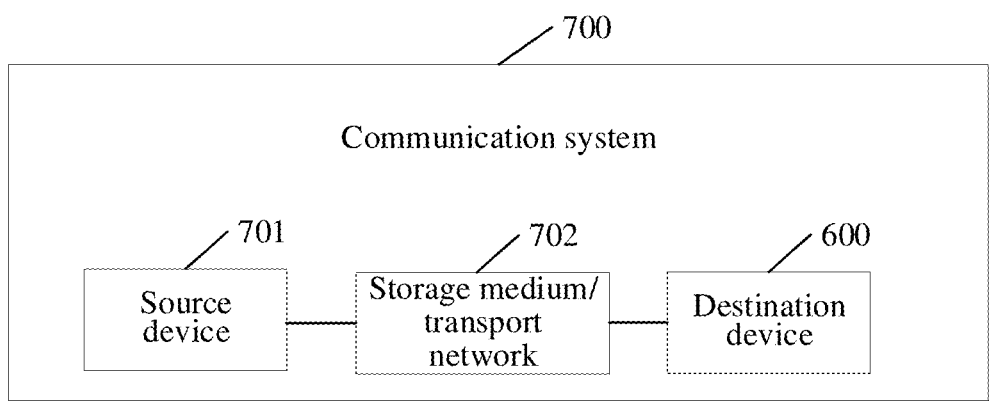
FIG. 17 is a schematic diagram of a structure of a communication system.

FIG. 17 is a schematic diagram of a structure of a communication system. As shown in FIG. 17, a communication system 700 may include a source device 701, a storage medium/transport network 702, and a destination device 600.

The source device 701 may be the sending device 500, and an output of the storage/sending unit 502 is processed by the storage medium/transport network 702 to store or transmit a bitstream. The receiving unit 601 in the destination device 600 obtains the bitstream from the storage medium/transport network 702. The receiving unit 601 may extract a new video bitstream from a media file or transport stream. The receiving unit 601 may also extract a new audio bitstream from the media file or transport stream.

As disclosed above, the disclosed method and device use multiple groups of CCLM parameters (i.e., linear model parameters, scale factors, and offset parameters) and transfer a reference position index into CU data for determining a CCLM mode parameter. Two methods are provided in an embodiment. A first method is to construct a list containing several candidate CCLM parameters. An index indicating a candidate CCLM parameter to be used is transferred to CU data. A second method is to transfer a reference position of a CCLM block, because a CCLM parameter is calculated using a sample of a reference position. In this VVC design, a position of a reference sample may be determined by a starting point s and a step length $\Delta$ between adjacent samples, so a reference position index is transferred to CU data to indicate values of s and $\Delta$ for locating the position of the reference sample, which is used for extracting the reference sample and then determining the CCLM mode parameter.

Figure 18:
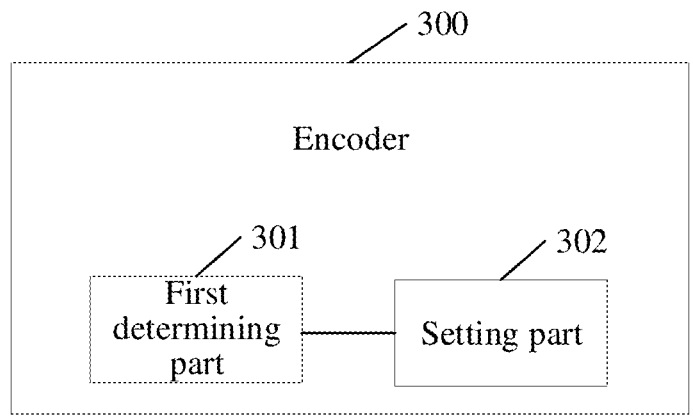
FIG. 18 is a first schematic diagram of a structure of an encoder.

Based on the above embodiments, in another embodiment of the present application, FIG. 18 is a first schematic diagram of a structure of an encoder. As shown in FIG. 18, the encoder 300 provided in an embodiment of the present application may include a first determining part 301 and a setting part 302.

The first determining part 301 is configured to determine multiple groups of corresponding CCLM parameters using multiple groups of reference samples of a current block when CCLM is used for the current block to determine an intra prediction value of the current block, wherein the CCLM parameter include a scale factor and an offset parameter; and determine a target CCLM parameter from the multiple groups of CCLM parameters.

The setting part 302 is configured to set a CCLM index value according to the target CCLM parameter and signal the CCLM index value in a bitstream, wherein the CCLM index value is used for indicating to use the target CCLM parameter.

The first determining part 301 is further configured to determine the intra prediction value of the current block according to the target CCLM parameter.

Further, in an embodiment of the present application, the first determining part 301 is specifically configured to, use a group of reference samples in multiple groups of reference samples to calculate a group of CCLM parameters corresponding to the group of reference samples; and traverse the multiple groups of reference samples to determine the multiple groups of CCLM parameters, wherein the multiple groups of reference samples include pixel sampling points adjacent to the current block.

Further, in an embodiment of the present application, the first determining part 301 is further specifically configured to use a Rate Distortion Optimization approach to select a group of CCLM parameters corresponding to an optimal value of a target cost function from the multiple groups of CCLM parameters and determine the group of CCLM parameters as the target CCLM parameter.

Further, in an embodiment of the present application, the setting part 302 is specifically configured to set the CCLM index value as an index number corresponding to the target CCLM parameter in the multiple groups of CCLM parameters; and signal the CCLM index value in a bitstream.

Further, in an embodiment of the present application, the first determining part 301 is further configured to determine position information of each group of reference samples in the multiple groups of reference samples; and determine an index number of each group of CCLM parameters in the multiple groups of CCLM parameters according to the position information of each group of reference samples.

Further, in an embodiment of the present application, the first determining part 301 is further specifically configured to determine multiple distance parameters between the multiple groups of reference samples and the current block according to position information of each group of reference samples; and set an index number of each group of CCLM parameters in the multiple groups of CCLM parameters sequentially according to an order of the distance parameters from small to large.

Further, in an embodiment of the present application, the setting part 302 is further specifically configured to signal the CCLM index value in a data unit containing encoded data of the current block in the bitstream.

Further, in an embodiment of the present application, the first determining part 301 is further specifically configured to use a linear model to calculate a prediction value of a second colour component of the current block according to the target CCLM parameter and a reconstruction value of a first colour component of the current block.

Further, in an embodiment of the present application, the first colour component is a luma component; and the second colour component is a chroma component.

Further, in an embodiment of the present application, the first determining part 301 is further specifically configured to determine a CCLM mode index parameter, wherein the CCLM mode index parameter is used for indicating a CCLM mode used for the current block, and the CCLM mode is used for indicating a calculation and derivation approach of determining the intra prediction value using CCLM; and signal the CCLM mode index parameter in a bitstream.

Further, in an embodiment of the present application, the setting part 302 is further configured to set a prediction mode parameter of the current block and signal the prediction mode parameter in a bitstream when CCLM is used for the current block to determine an intra prediction value of the current block.

Figure 19:
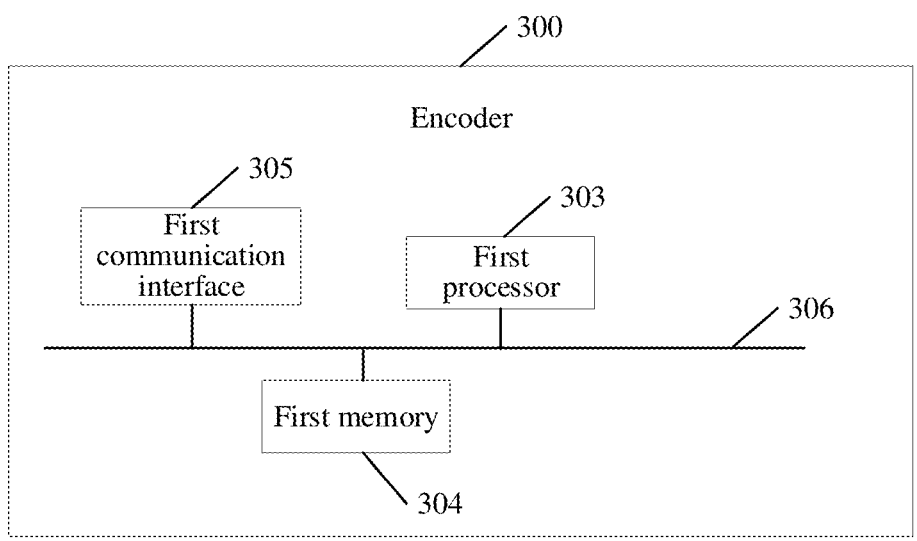
FIG. 19 is a second schematic diagram of a structure of an encoder.

FIG. 19 is a second schematic diagram of a structure of an encoder. As shown in FIG. 19, an encoder 300 provided in an embodiment of the present application may further include a first processor 303, a first memory 304 configured to store instructions executable for the first processor 303, a first communication interface 305, and a first bus 306 configured to connect the first processor 303, the first memory 304, and the first communication interface 305.

Further, in an embodiment of the present application, the first processor 303 is configured to determine multiple groups of corresponding CCLM parameters using multiple groups of reference samples of the current block when CCLM is used for the current block to determine an intra prediction value of the current block, wherein the CCLM parameter includes a scale factor and an offset parameter; determine a target CCLM parameter from the multiple groups of CCLM parameters, and set a CCLM index value according to the target CCLM parameter and signal the CCLM index value in a bitstream, wherein the CCLM index value is used for indicating to use the target CCLM parameter; and determine the intra prediction value of the current block according to the target CCLM parameter.

In addition, various functional modules in the embodiments may be integrated into one processing unit, or various units may be physically presented separately, or two or more than two units may be integrated into one unit. The integrated units may be implemented in a form of hardware, or may be implemented in a form of a software functional module.

The integrated units, if implemented in a form of a software functional module and not sold or used as an independent product, may be stored in a computer-readable storage medium. Based on such understanding, the technical solutions of the embodiments, in essence, or part contributing to the prior art, or all or part of the technical solutions, may be embodied in a form of a software product. The computer software product is stored in a storage medium, and includes several instructions for enabling a computer device (which may be a personal computer, a server, or a network device, etc.) or a processor to perform all or part of acts of the methods of the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

An embodiment of the present application provides a picture encoder. When CCLM is used for a current block to determine an intra prediction value of the current block, the encoder determines multiple groups of corresponding CCLM parameters using multiple groups of reference samples of the current block, wherein a CCLM parameter includes a scale factor and an offset parameter. The encoder determines a target CCLM parameter from the multiple groups of CCLM parameters, and sets a CCLM index value according to the target CCLM parameter and signals the CCLM index value in a bitstream, wherein the CCLM index value is used for indicating to use the target CCLM parameter. The encoder determines the intra prediction value of the current block according to the target CCLM parameter. It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined using the target CCLM parameter. That is to say, according to the method for predicting the colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

Figure 20:
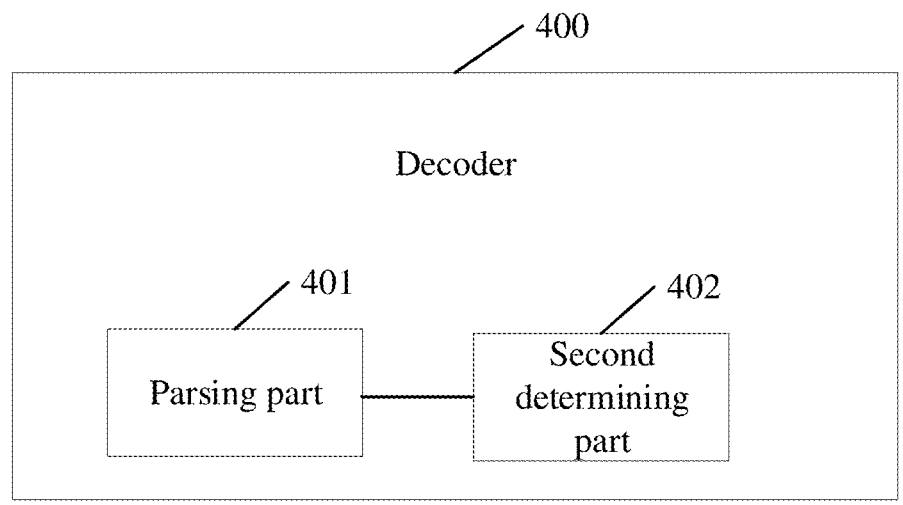
FIG. 20 is a first schematic diagram of a structure of a decoder.

Based on the above embodiments, in another embodiment of the present application, FIG. 20 is a first schematic diagram of a structure of a decoder. As shown in FIG. 20, a decoder 400 provided in an embodiment of the present application may include a parsing part 401 and a second determining part 402.

The parsing part 401 is configured to parse a bitstream.

The second determining part 402 is configured to determine a prediction mode parameter of a current block.

The parsing part 401 is further configured to parse the bitstream when the prediction mode parameter indicates to determine an intra prediction value of the current block using CCLM.

The second determining part 402 is further configured to determine a CCLM index value of the current block; determine a target CCLM parameter of the current block according to the CCLM index value, wherein the target CCLM parameter includes a scale factor and an offset parameter;

and determine the intra prediction value of the current block according to the target CCLM parameter.

Further, in an embodiment of the present application, the second determining part 402 is specifically configured to determine a target reference sample of the current block according to the CCLM index value, wherein the target reference sample is one or more pixel sampling points adjacent to the current block; and determine the target CCLM parameter of the current block according to the target reference sample.

Further, in an embodiment of the present application, the second determining part 402 is further specifically configured to determine the target reference sample from multiple groups of reference samples of the current block according to an index number indicated by the CCLM index value, wherein each group of reference samples in the multiple groups of reference samples includes pixel sampling point(s) at one or more preset positions adjacent to the current block.

Further, in an embodiment of the present application, the second determining part 402 is further specifically configured to determine position information of each group of reference samples in the multiple groups of reference samples; determine multiple distance parameters between the multiple groups of reference samples and the current block according to the position information of each group of reference samples; sequentially set a position index number of each group of reference samples in the multiple groups of reference samples according to an order of the distance parameters from small to large; and select a group of reference samples with a same position index number as an index number indicated by the CCLM index value from the multiple groups of reference samples as target reference samples.

Further, in an embodiment of the present application, the second determining part 402 is further specifically configured to determine multiple groups of corresponding CCLM parameters using multiple groups of reference samples of the current block, wherein each group of reference samples in the multiple groups of reference samples includes pixel sampling point(s) at one or more preset positions adjacent to the current block; and use a group of CCLM parameters indicated by the CCLM index value in the multiple groups of CCLM parameters as the target CCLM parameter.

Further, in an embodiment of the present application, the second determining part 402 is further specifically configured to determine position information of each group of reference samples in the multiple groups of reference samples; determine multiple distance parameters between the multiple groups of reference samples and the current block according to the position information of each group of reference samples; sequentially set an index number of each group of CCLM parameters in the multiple groups of CCLM parameters according to an order of the distance parameters from small to large; and use a group of CCLM parameters with a same index number in the CCLM parameters as an index number indicated by the CCLM index value as the target CCLM parameter.

Further, in an embodiment of the present application, the second determining part 402 is further specifically configured to use a linear model to calculate a prediction value of a second colour component of the current block according to the target CCLM parameter and a reconstruction value of a first colour component of the current block.

Further, in an embodiment of the present application, the first colour component is a luma component; and the second colour component is a chroma component.

Further, in an embodiment of the present application, the parsing part 401 is further configured to, after a bitstream is parsed and a prediction mode parameter of a current block is determined, parse the bitstream when the prediction mode parameter indicates to determine an intra prediction value of the current block using CCLM.

The second determining part 402 is further configured to determine a CCLM mode index parameter of the current block, wherein the CCLM mode index parameter is used for indicating a CCLM mode used for the current block, and the CCLM mode is used for indicating a calculation and derivation approach of determining the intra prediction value using CCLM.

Figure 21:
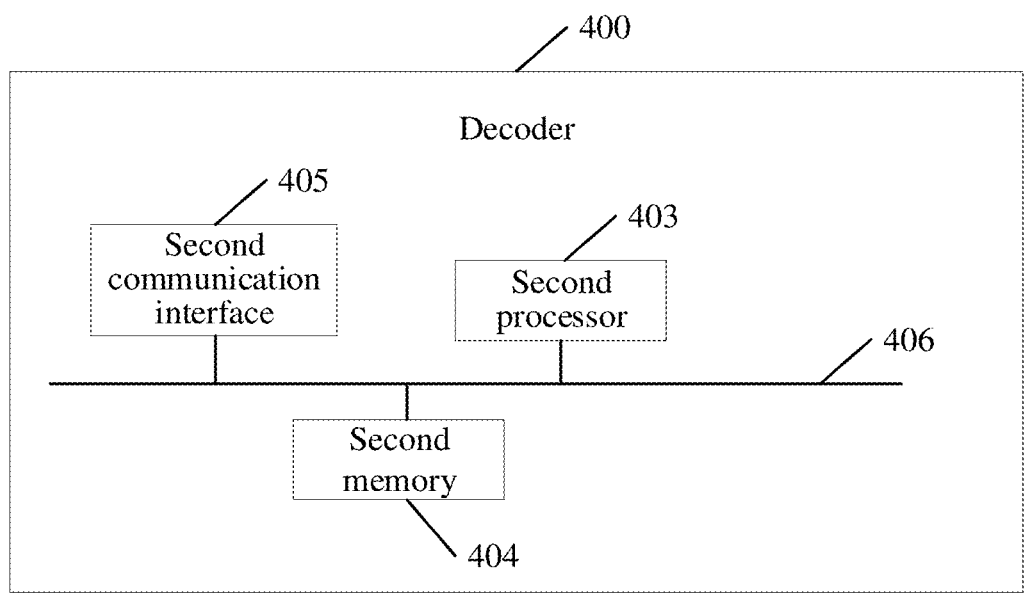
FIG. 21 is a second schematic diagram of a structure of a decoder.

FIG. 21 is a second schematic diagram of a structure of a decoder. As shown in FIG. 21, a decoder 400 provided in an embodiment of the present application may further include a second processor 403, a second memory 404 configured to store instructions executable for the second processor 403, a second communication interface 405, and a second bus 406 configured to connect the second processor 403, the second memory 404, and the second communication interface 405.

Further, in an embodiment of the present application, the second processor 403 is configured to parse a bitstream and determine a prediction mode parameter of a current block; parse the bitstream and determine a CCLM index value of the current block when the prediction mode parameter indicates to determine an intra prediction value of the current block using CCLM; determine a target CCLM parameter of the current block according to the CCLM index value, wherein the target CCLM parameter includes a scale factor and an offset parameter; and determine the intra prediction value of the current block according to the target CCLM parameter.

In addition, various functional modules in the embodiments may be integrated into one processing unit, or various units may be physically presented separately, or two or more than two units may be integrated into one unit. The integrated units may be implemented in a form of hardware, or may be implemented in a form of a software functional module.

The integrated units, if implemented in a form of a software functional module and not sold or used as an independent product, may be stored in a computer-readable storage medium. Based on such understanding, the technical solutions of the embodiments, in essence, or part contributing to the prior art, or all or part of the technical solutions, may be embodied in a form of a software product. The computer software product is stored in a storage medium, and includes several instructions for enabling a computer device (which may be a personal computer, a server, or a network device, etc.) or a processor to perform all or part of acts of the methods of the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

An embodiment of the present application provides a picture decoder. The decoder parses a bitstream and determines a prediction mode parameter of a current block; parses the bitstream and determines a CCLM index value of the current block when the prediction mode parameter indicates to determine an intra prediction value of the current block using CCLM; determines a target CCLM parameter of the current block according to the CCLM index value, wherein the target CCLM parameter includes a scale factor and an offset parameter; and determine the intra prediction value of the current block according to the target CCLM parameter. It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined using the target CCLM parameter. That is to say, according to the method for predicting the colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

An embodiment of the present application provides a computer-readable storage medium on which a program is stored, when the program is executed by a processor, the method described in the foregoing embodiments is implemented.

Specifically, program instructions corresponding to a method for predicting a colour component in an embodiment may be stored on a storage medium such as an optical disk, a hard disk, and a U disk. When program instructions corresponding to a method for predicting a colour component in a storage medium are read or executed by an electronic device, following acts are included: when CCLM is used for a current block to determine an intra prediction value of the current block, multiple groups of corresponding CCLM parameters are determined using multiple groups of reference samples of the current block, wherein the CCLM parameter includes a scale factor and an offset parameter; a target CCLM parameter is determined from the multiple groups of CCLM parameters, and a CCLM index value is set according to the target CCLM parameter and signalled in a bitstream, wherein the CCLM index value is used for indicating to use the target CCLM parameter; and the intra prediction value of the current block is determined according to the target CCLM parameter.

Specifically, program instructions corresponding to a method for predicting a colour component in an embodiment may be stored on a storage medium such as an optical disk, a hard disk, and a U disk. When program instructions corresponding to a method for predicting a colour component in a storage medium are read or executed by an electronic device, following acts are included: a bitstream is parsed and a prediction mode parameter of a current block is determined; the bitstream is parsed and a CCLM index value of the current block is determined when the prediction mode parameter indicates to determine an intra prediction value of the current block using CCLM; a target CCLM parameter of the current block is determined according to the CCLM index value, wherein the target CCLM parameter includes a scale factor and an offset parameter; and the intra prediction value of the current block is determined according to the target CCLM parameter.

It should be understood by a person skilled in the art that the embodiments of the present application may be provided as methods, systems, or computer program products. Therefore, the present application may use a form of a hardware embodiment, a software embodiment, or an embodiment combining software and hardware. Moreover, the present application may use a form of a computer program product implemented on one or more computer usable storage media (including, but not limited to, a magnetic disk memory, an optical memory, etc.) containing computer executable program codes.

The present application is described with reference to implementation flowcharts and/or block diagrams of the methods, devices (systems), and computer program products of the embodiments of the present application. It should be understood that each flow and/or block in the flowcharts and/or the block diagrams, and combinations of flows and/or blocks in the flowcharts and/or the block diagrams may be implemented by computer program instructions. These computer program instructions may be provided to a processor of a general purpose computer, a special purpose computer, an embedded processing machine, or another programmable data processing device to generate a machine, such that an apparatus for implementing functions specified in one or more flows in the implementation flowcharts and/or one or more blocks in the block diagrams is generated through instructions that are executed by a processor of a computer or another programmable data processing device.

These computer program instructions may also be stored in a computer-readable memory that may guide a computer or another programmable data processing device to operate in a particular manner, such that instructions stored in the computer-readable memory generate an article of manufacture including an instruction apparatus, wherein the instruction apparatus implements functions specified in one or more flows in the implementation flowcharts and/or one or more blocks in the block diagrams.

These computer program instructions may also be loaded on a computer or another programmable data processing device to enable a series of operational acts to be performed on the computer or the another programmable device to generate computer-implemented processing, such that instructions executed on the computer or the another programmable device provide acts for implementing functions specified in one or more flows in the implementation flowcharts and/or one or more blocks in the block diagrams.

The above are only preferred embodiments of the present application and are not intended to limit the scope of protection of the present application.

INDUSTRIAL APPLICABILITY

The embodiments of the present application provide a method for predicting a colour component, an encoder, a decoder, and a storage medium. When CCLM is used for a current block to determine an intra prediction value of the current block, an encoder determines multiple groups of corresponding CCLM parameters using multiple groups of reference samples of the current block, wherein a CCLM parameter includes a scale factor and an offset parameter. The encoder determines a target CCLM parameter from the multiple groups of CCLM parameters, and sets a CCLM index value according to the target CCLM parameter and signals the CCLM index value in a bitstream, wherein the CCLM index value is used for indicating to use the target CCLM parameter. The encoder determines the intra prediction value of the current block according to the target CCLM parameter. The decoder parses a bitstream and determines a prediction mode parameter of a current block; parses the bitstream and determines a CCLM index value of the current block when the prediction mode parameter indicates to determine an intra prediction value of the current block using CCLM; determines a target CCLM parameter of the current block according to the CCLM index value, wherein the target CCLM parameter includes a scale factor and an offset parameter; and determines the intra prediction value of the current block according to the target CCLM parameter. It can be seen that in an embodiment of the present application, when determining that CCLM is used for a current block to determine an intra prediction value of the current block, an encoder may determine multiple groups of corresponding CCLM parameters based on multiple groups of reference samples adjacent to the current block, and determine an optimal target CCLM parameter from the multiple groups of CCLM parameters. A CCLM index value indicating to use a target CCLM parameter may be signalled in a bitstream by the encoder and transmitted to a decoding side. Therefore, a decoder may obtain the CCLM index value after parsing the bitstream, and determine the target CCLM parameter indicated by the CCLM index value, so that the intra prediction value of the current block may be determined by using the target CCLM parameter. That is to say, according to the method for predicting the colour component provided in the present application, a target CCLM parameter in multiple groups of CCLM parameters of a current block may be signalled in a bitstream for transmission, so that a decoder may determine to perform an intra prediction processing on the current block according to the target CCLM parameter, which greatly reduces complexity of encoding and decoding processing and improves encoding and decoding efficiency.

What is claimed is:

1. A method for predicting a colour component, which is applied to an encoder, the method comprising:
    determining multiple groups of corresponding Cross-component Linear Model Prediction (CCLM) parameters using multiple groups of reference samples of a current block when CCLM is used for the current block to determine an intra prediction value of the current block, wherein the CCLM parameter comprises a scale factor and an offset parameter;
    determining a target CCLM parameter from the multiple groups of CCLM parameters, setting a CCLM index value according to the target CCLM parameter and signalling the CCLM index value in a bitstream, wherein the CCLM index value is used for indicating to use the target CCLM parameter; and
    determining the intra prediction value of the current block according to the target CCLM parameter;
    wherein the multiple groups of CCLM parameters correspond to the multiple groups of reference samples respectively.

2. The method according to claim 1, wherein the determining multiple groups of corresponding CCLM parameters using multiple groups of reference samples of the current block, comprises:
    the multiple groups of reference samples comprise pixel sampling points adjacent to the current block;
    calculating a group of CCLM parameters corresponding to a group of reference samples using the group of reference samples in the multiple groups of reference samples; and
    traversing the multiple groups of reference samples to determine the multiple groups of CCLM parameters.

3. The method according to claim 1, wherein the determining the target CCLM parameter from the multiple groups of CCLM parameters, comprises:
    selecting a group of CCLM parameters corresponding to an optimal value of a target cost function from the multiple groups of CCLM parameters using a Rate Distortion Optimization approach, and determining the group of CCLM parameters as the target CCLM parameter.

4. The method according to claim 1, wherein the setting the CCLM index value according to the target CCLM parameter and signalling the CCLM index value in the bitstream, comprises:
    setting the CCLM index value as an index number corresponding to the target CCLM parameter in the multiple groups of CCLM parameters; and
    signalling the CCLM index value in the bitstream.

5. The method according to claim 4, further comprising:
    determining position information of each group of reference samples in the multiple groups of reference samples; and
    determining the index number of each group of CCLM parameters in the multiple groups of CCLM parameters according to the position information of each group of reference samples.

6. The method according to claim 5, wherein the determining the index number of each group of CCLM parameters in the multiple groups of CCLM parameters according to the position information of each group of reference samples, comprises:
    determining multiple distance parameters between the multiple groups of reference samples and the current block according to the position information of each group of reference samples; and
    setting the index number of each group of CCLM parameters in the multiple groups of CCLM parameters sequentially according to an order of the distance parameters from small to large.

7. The method according to claim 4, wherein the signalling the CCLM index value in the bitstream, comprises:
    signalling the CCLM index value in a data unit containing encoded data of the current block in the bitstream.

8. The method according to claim 1, wherein the determining the intra prediction value of the current block according to the target CCLM parameter, comprises:
    calculating a prediction value of a second colour component of the current block using a linear model according to the target CCLM parameter and a reconstruction value of a first colour component of the current block.

9. The method according to claim 8, wherein the first colour component is a luma component; and the second colour component is a chroma component.

10. The method according to claim 1, wherein before determining multiple groups of corresponding CCLM parameters using multiple groups of reference samples of the current block, the method further comprises:
    determining a CCLM mode index parameter, wherein the CCLM mode index parameter is used for indicating a CCLM mode used for the current block, and the CCLM mode is used for indicating a calculation and derivation approach of determining the intra prediction value using CCLM; and
    signalling the CCLM mode index parameter in a bitstream.

11. The method according to claim 1, further comprising:
    setting a prediction mode parameter of the current block and signalling the prediction mode parameter in the bitstream when CCLM is used for the current block to determine the intra prediction value of the current block.

12. A method for predicting a colour component, which is applied to a decoder, the method comprising:
   parsing a bitstream and determining a prediction mode parameter of a current block;
   parsing the bitstream and determining a Cross-component Linear Model Prediction (CCLM) index value of the current block when the prediction mode parameter indicates to determine an intra prediction value of the current block using CCLM;
   determining a target CCLM parameter of the current block according to the CCLM index value, wherein the target CCLM parameter comprises a scale factor and an offset parameter; and
   determining the intra prediction value of the current block according to the target CCLM parameter;
   wherein the multiple groups of CCLM parameters correspond to the multiple groups of reference samples respectively.

13. The method according to claim 12, wherein the determining the target CCLM parameter of the current block according to the CCLM index value, comprises:
   determining a target reference sample of the current block according to the CCLM index value, wherein the target reference sample is one or more pixel sampling points adjacent to the current block; and
   determining the target CCLM parameter of the current block according to the target reference sample.

14. The method according to claim 13, wherein the determining the target reference sample of the current block according to the CCLM index value, comprises:
   determining the target reference sample from multiple groups of reference samples of the current block according to an index number indicated by the CCLM index value, wherein each group of reference samples in the multiple groups of reference samples comprises pixel sampling point(s) at one or more preset positions adjacent to the current block.

15. The method according to claim 12, wherein the determining the target CCLM parameter of the current block according to the CCLM index value, comprises:
   determining multiple groups of corresponding CCLM parameters using multiple groups of reference samples of the current block, wherein each group of reference samples in the multiple groups of reference samples comprises pixel sampling point(s) at one or more preset positions adjacent to the current block; and
   using a group of CCLM parameters indicated by the CCLM index value in the multiple groups of CCLM parameters as the target CCLM parameter.

16. The method according to claim 12, wherein the determining the intra prediction value of the current block according to the target CCLM parameter, comprises:
   calculating a prediction value of a second colour component of the current block using a linear model according to the target CCLM parameter and a reconstruction value of a first colour component of the current block.

17. The method according to claim 16, wherein the first colour component is a luma component; and the second colour component is a chroma component.

18. The method according to claim 12, wherein after parsing the bitstream and determining the prediction mode parameter of the current block, the method further comprises:
   parsing the bitstream and determining a CCLM mode index parameter of the current block when the prediction mode parameter indicates to determine the intra prediction value of the current block using CCLM, wherein the CCLM mode index parameter is used for indicating a CCLM mode used for the current block, and the CCLM mode is used for indicating a calculation and derivation approach of determining the intra prediction value using CCLM.

19. An encoder comprising a first processor and a first memory storing instructions executable for the first processor, wherein when the instructions are executed, the first processor implements the method according to claim 1.

20. A decoder comprising a second processor and a second memory storing instructions executable for the second processor, wherein when the instructions are executed, the second processor implements the method according to claim 12.

* * * * *